United States Patent [19]

Stokes

[11] Patent Number: 4,870,515
[45] Date of Patent: Sep. 26, 1989

[54] MUSIC MEMORY DATA RECORDING, STORAGE AND PLAYBACK SYSTEM FOR MAGNETIC RECORDING AND/OR REPRODUCING APPARATUS

[76] Inventor: Richard A. Stokes, 36 Lost Feather Dr., Fairport, N.Y. 14450

[21] Appl. No.: 938,594

[22] Filed: Dec. 5, 1986

[51] Int. Cl.$^4$ .............................................. G11B 15/18
[52] U.S. Cl. .................................. 360/72.2; 360/74.4
[58] Field of Search ..................... 360/72.2, 72.1, 74.4, 360/69

[56] References Cited

U.S. PATENT DOCUMENTS

| | | | |
|---|---|---|---|
| 4,338,644 | 7/1982 | Staar | 360/72.2 |
| 4,473,854 | 9/1984 | Oishi et al. | 360/72.2 |
| 4,630,143 | 12/1986 | Juso et al. | 360/72.2 |

*Primary Examiner*—John H. Wolff
*Attorney, Agent, or Firm*—Wall and Roehrig

[57] ABSTRACT

A recording and/or reproducing device, such as a cassette tape player, records data on the cassette in advance of the recorded material, to identify the recorded selections by artist, title, etc., and also to identify the position at which each of the recorded selections begins. When the tape is played back, this header data is read from the tape, and the artist, title and location data are stored in memory. The stored title and artist data are displayed, and can be scrolled by a user. The user then selects a desired one of the recorded selections based on the displayed artist and title data. The player automatically advances the tape or other record medium to the beginning of the desired selection based on the location data stored in the memory. A number of selections can be automatically played in this fashion in the order desired. The apparatus can be an automotive tape player, wherein the associated display unit is a heads-up display reflected in the vehicle windshield.

20 Claims, 22 Drawing Sheets

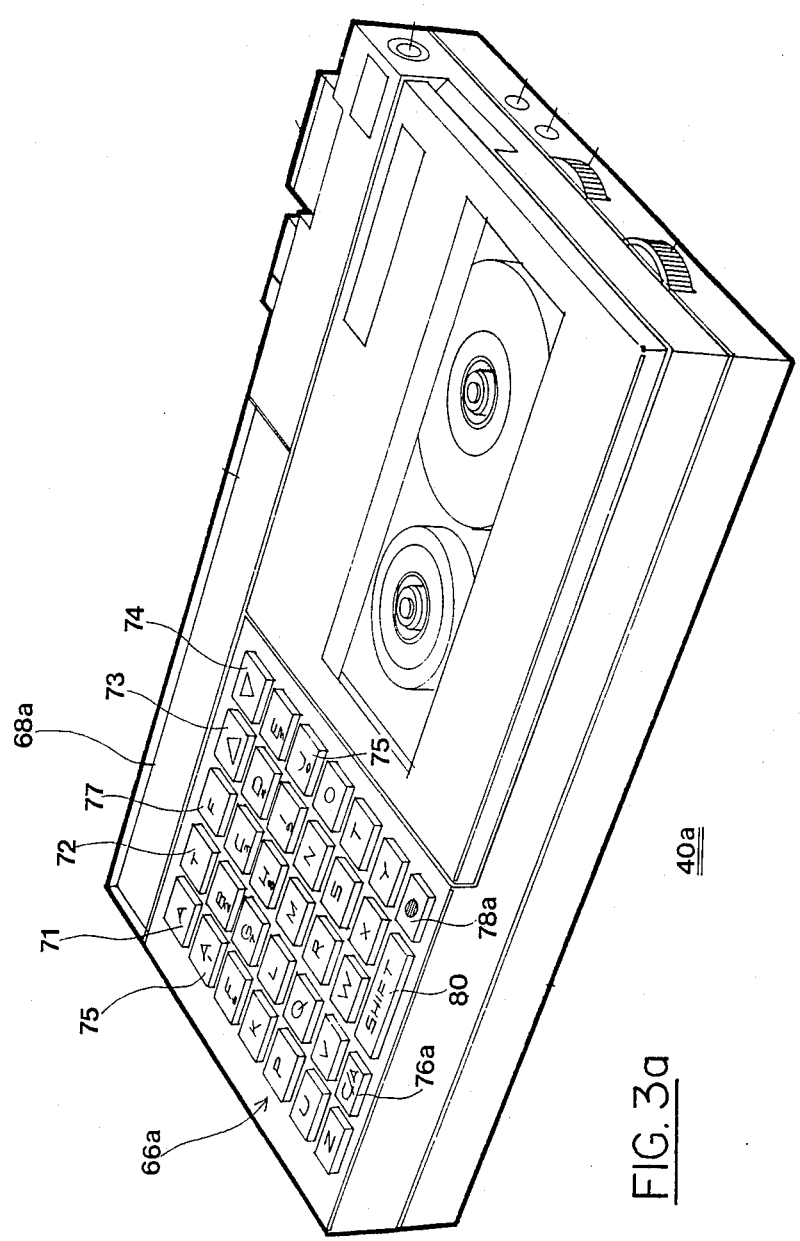

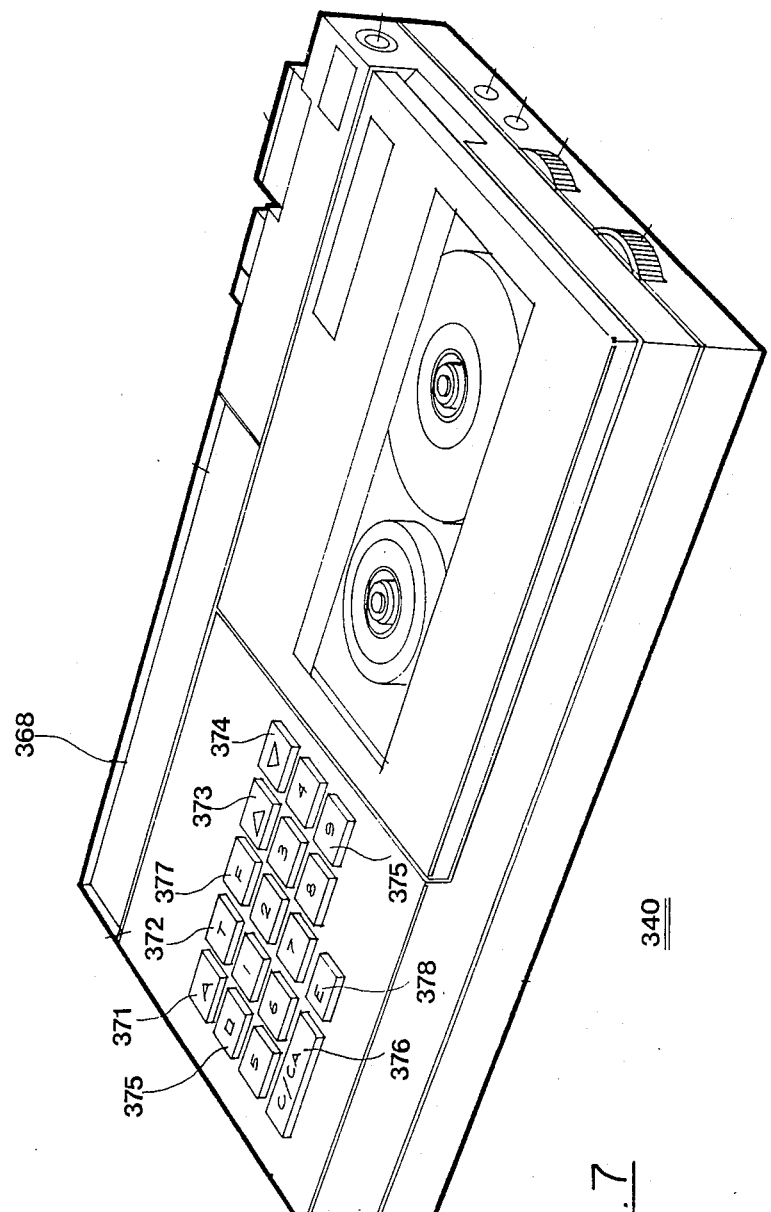

FIG. II

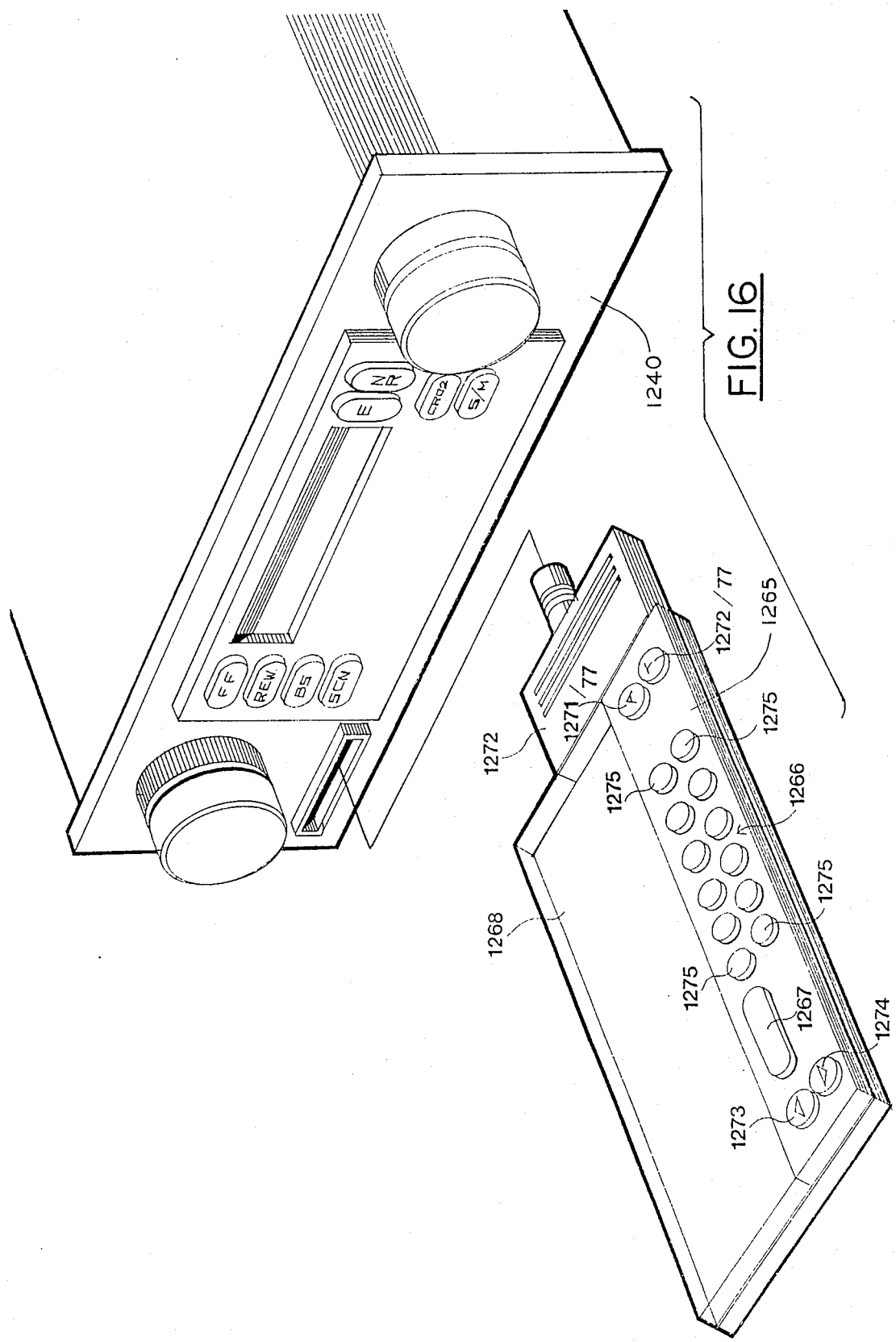

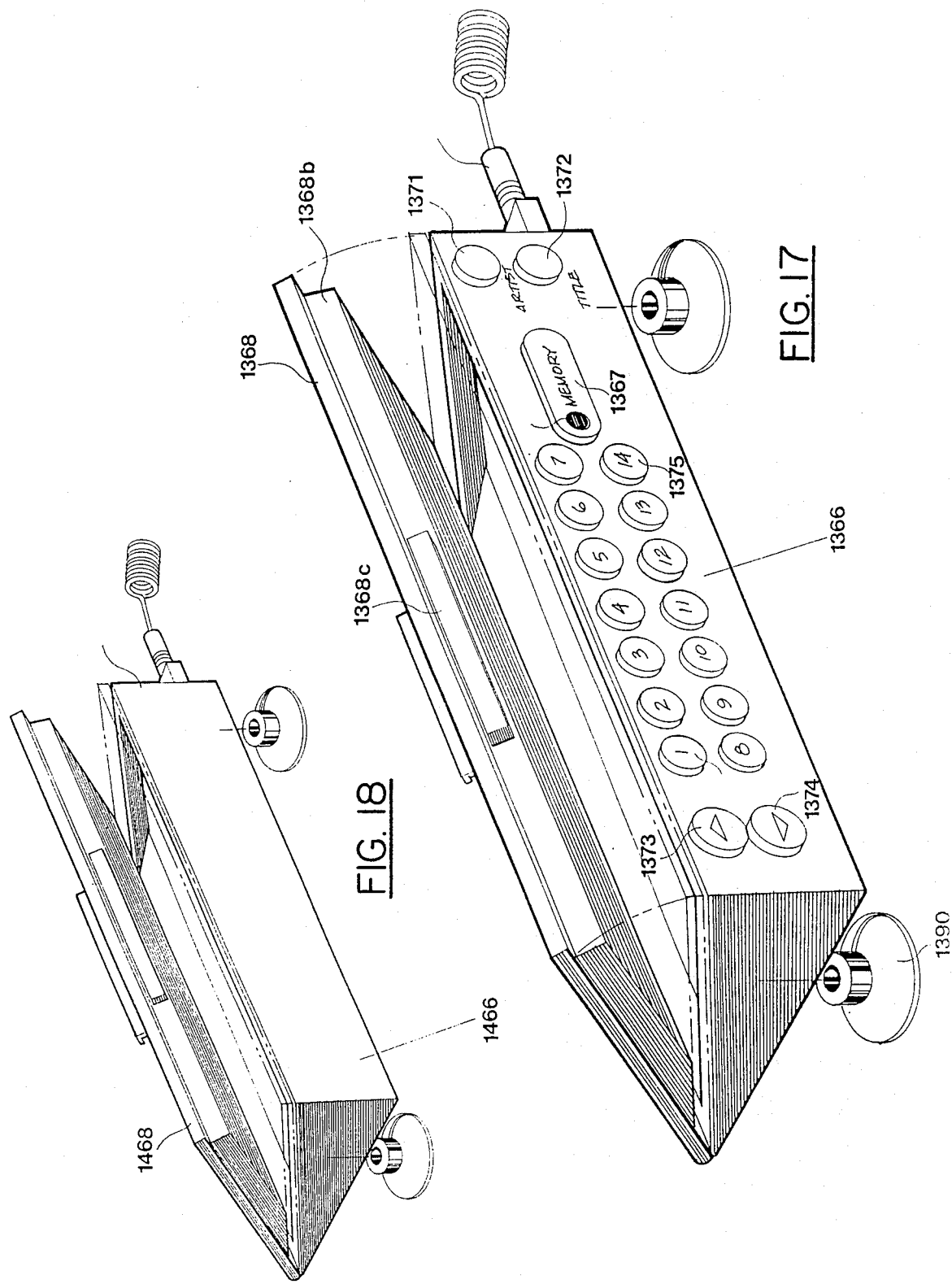

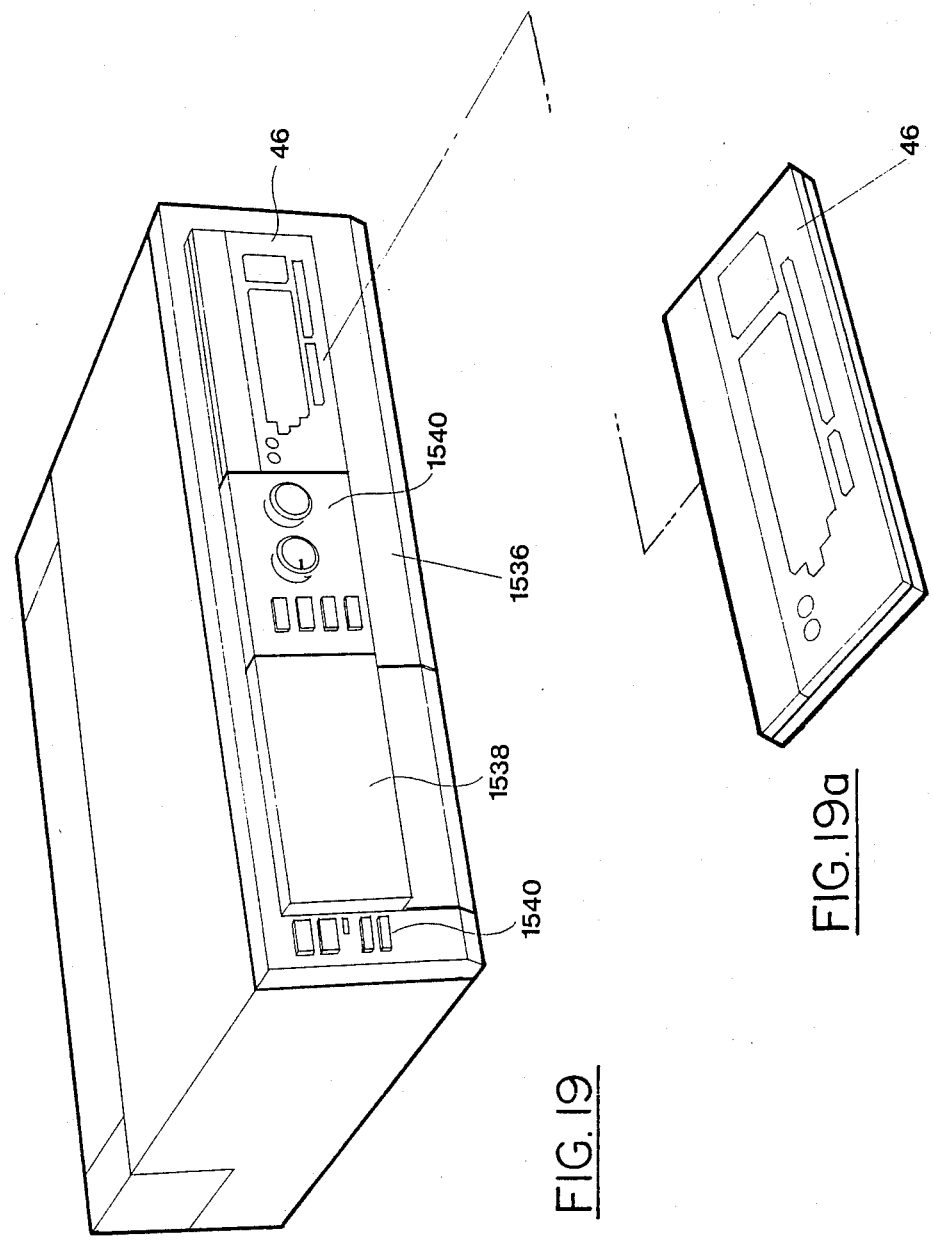

MUSIC MEMORY DATA RECORDING, STORAGE AND PLAYBACK SYSTEM FOR MAGNETIC RECORDING AND/OR REPRODUCING APPARATUS

BACKGROUND OF THE INVENTION

This invention relates to apparatus for recording and/or reproducing music and the like, and is more especially directed to the encoding, sensing, storage, and playback of data related to the title, artist, playing time, track, and location of music or other selections on a magnetic tape, such as a standard audio cassette tape.

Until now, the best information that could be obtained about magnetically recorded music (i.e., taped music) was the track location, obtained by sensing the location of an unrecorded or silent break between recorded segments or "tracks". This technique is sometimes referred to as break sensing or gap sensing. No information concerning the content of the recorded music or other selection was available to the user. Also, the break sensing technique can sometimes be "fooled" by a pianissimo passage or tacet segment of a recorded selection. This break sensing or gap sensing technique is described in U.S. Pat. No. 4,301,482 to Trevithick.

An alternative approach is the "smart cassette" system, such as is described in U.S. Pat. No. 4,388,644 to Staar. In that technique, a magnetic tape cassette has a semiconductor chip incorporated into the cassette housing, and this chip stores information concerning the tape. These systems, however, are intended mostly to calculate and indicate the tape position and amount of tape remaining more accurately than the mechanical tape sensing systems that they replace. Furthermore, the "smart cassette" system cannot be used to advantage with ordinary tape cassettes, because the pertinent data are stored on the semiconductor chip, and not on the tape itself.

OBJECTS AND SUMMARY OF THE INVENTION

It is an object of this invention to provide magnetic recording and/or reproducing apparatus which can display to the user a wide variety of data about musical selections recorded on the magnetic tape or other medium.

It is a more specific object of this invention to provide magnetic recording and/or reproducing apparatus which displays identifying information concerning the musical selections, for example, artist, title, track, playing time, album name or number, and which identifies as well the specific location on the medium at which the desired selection commences.

It is a related object of this invention to provide such apparatus which enables a user to choose which tracks or musical selections are to be played, and in what order, and which automatically carries out the playback of these selections in the desired order.

It is still another object of this invention to provide such apparatus in which the data concerning the musical selections recorded on a particular tape cassette are stored on the medium at a predetermined location.

It is yet another object of this invention to provide recording and/or reproducing apparatus in which the artist, title, and location information concerning the music selections for a number of cassette or other media can be permanently stored in a library memory, so that a user can quickly locate a given selection of music.

In accordance with one aspect of this invention, recording and/or reproducing apparatus, which can, for example, be a cassette tape player, is capable of playing one or more musical selections that are serially recorded on a tape cassette or other record medium. There is a space provided on the cassette tape or other medium ahead of the first of the serially recorded selections, and a block of data is recorded there that identifies the musical selection, for example, by title, artist, album name, etc. (hereinafter referred to simply as title information), as well as the respective locations of the selections on the tape or other medium. A keyboard or other data entry means is employed for entering the title information and the location data for each of the selections on the medium, and a memory unit stores the title and location data. The data so stored in the memory unit are automatically transferred and recorded as a block onto the space provided for that purpose on the record medium. When the cassette tape or other medium is played back, the magnetic head or other similar playback means reproduces the title and location data that have been previously recorded. These reproduced data are then transferred as reproduced title and location data into the memory unit of the apparatus, and the title information, that is, the artist, title, album number, etc., are displayed on an LCD display or other suitable display means. A key cluster or other appropriate selecting means are provided on the apparatus for selecting a desired one, or a sequence of, the recorded selections based on the displayed title data. When the user has chosen the desired selections, the apparatus automatically advances the record medium to the commencement of the desired selection, based on the reproduced location data associated with it and stored in the memory unit.

In several preferred embodiments, the stored location data include binary count data representing the tape position for the commencement of each of the associated musical selections. There is normally provided a break interval between the recorded selections or "tracks", on the tape or other medium. The apparatus further comprises a counter for measuring the position of the tape during advancement thereof and break sense means for detecting the blank or silent break intervals moving past during advancement of the tape. A comparison arrangement coupled to the memory unit, to the counter, and to the break sense means, compares the tape position binary count data with the measured position of the tape, and then commences the reproduction of the desired selection at a detected break interval that corresponds with a coincidence between the measured position of the tape an the associated stored binary count data.

If the tracks contain digitized audio, any of several well-known means can be employed to identify the commencement of a particular selection. Typically, a specially coded signature is used, together with a digital time or tape length code.

In several embodiments, the recording and/or reproducing apparatus is a portable, battery-powered tape cassette recorder/player, and in other embodiments, the apparatus can be a dash-mounted automotive tape player, with the artist, title, and other title information for the selections being displayed on a heads-up display unit.

The apparatus of this invention provides data about the recorded music in a manner that gives a great deal of flexibility for the user of the apparatus.

The title and location data for the selections can additionally be recorded in a permanent library memory, as well as on the cassette tape, so that a user can quickly determine on which cassette a particular selection might be located. Then, when searching the permanent library for a particular piece of music, the selection may be sought out under either the title of the album, the title of the musical piece, the writer or the composer, the orchestra, or by some other identifying means, as the user desires to program and organize these catagories. The library data can be taken on a portable memory unit to a music store, so that the user can consult his inventory of music when deciding what new records or tapes to buy.

The music memory and coding and storage can either be modular (i.e., removable from a standard recorder/player) or non modular (i.e., permanently built in).

The data concerning the artist, title, etc., can be entered by means of a manual keyboard, by magnetic or optical scanning of an album cover, by a special strip or data page, or by direct transfer of data between a terminal at the point of purchase at a record or tape store, or from a database via telephone lines and modem. In addition, a removable RAM type memory device may be used.

Moreover, data recorded on one cassette tape can be directly transferred to another cassette tape, if the tape is copied, in the same transfer operation in which the recorded selections are transferred. Thus, the data can be transferred in tape-to-tape, memory-to-tape, or tape-to-memory modes.

Still further, data may be transferred to the recorder/player memory from an acoustic disc player or a laser compact disc player, if properly equipped to sense, decode and store data associated with the music tracks of the disc. The title data duplicated in this manner could be transferred or duplicated along with the music tracks themselves directly from the disc to the recorder/player memory unit and/or tape leader. However, because of differences in recording speed, etc., track location data would be transferred first to memory, and would not be transferred from one recorded medium type to another directly (i.e., from reel-to-reel to cassette, or from disc to tape).

If the information recorded on the tape is also to be recorded in a permanent library RAM or other memory unit, the particular cassette identifying number can be recorded there alone as location data. In that manner, using the RAM containing the library titles for a number of cassettes, the user can directly look up the data connected with the particular cassette number, and the same can be displayed.

The above and many other objects, features and advantages of this invention will be more clearly understood from the ensuing description of several preferred embodiments, which are intended not to be exhaustive, but rather to illustrate the range of possible variations of this invention. This description is to be read in conjunction with the accompanying drawing.

BRIEF DESCRIPTION OF THE DRAWING

FIGS. 3 and 3A are perspective views illustrating a first embodiment of recording and/or reproducing apparatus according to this invention and a variant thereof.

FIGS. 7, 7A, 7B, and 7C are perspective views of still another embodiment of this invention and of variants thereof.

FIG. 16 illustrates an automotive tape player according to a further embodiment of this invention.

FIGS. 17 and 18A are perspective views of alternative headsetup display units incorporated in embodiments of this invention.

FIGS. 18B and 18C are schematic side elevations for explaining the operation of the units of FIGS. 17 and 18.

FIG. 19 illustrates yet another embodiment of this invention taking the form of a cassette tape deck unit with a hand-held control unit that can be disposed alternatively in a resident position or remote position.

FIG. 19A shows a portion of the embodiment of FIG. 19.

DETAILED DESCRIPTION OF THE PREFERRED EMBODIMENT

Figure 1:
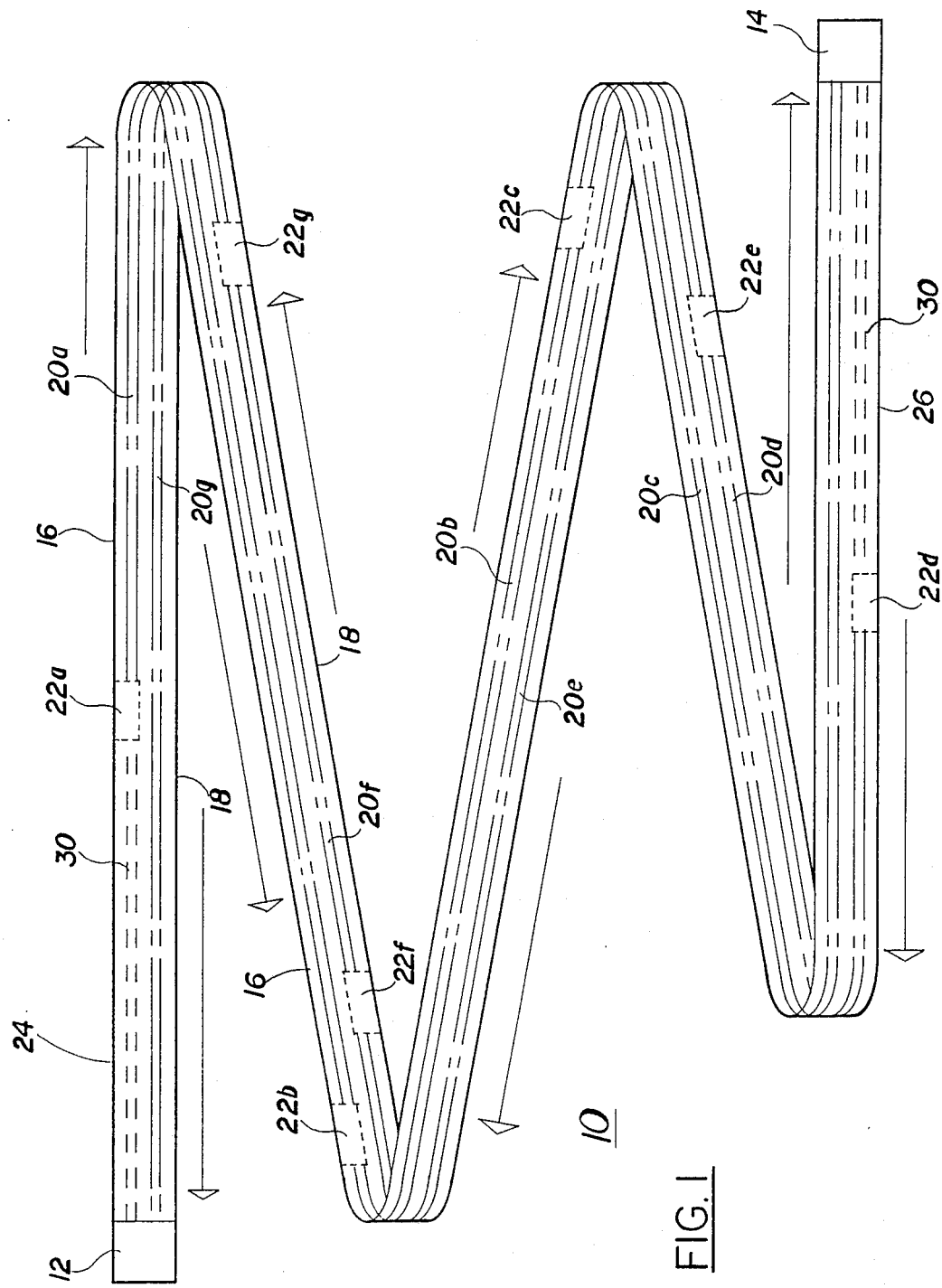
FIG. 1 is a diagramatic illustration of a magnetic recording tape having a plurality of musical selections recorded thereon.

With reference to the drawing, FIG. 1 schematically illustrates a magnetic recording tape 10, such as is employed in a reel-to-reel or cassette environment, having tape ends 12 and 14, and with a first or "A" side 16 which is recorded in one direction (from end 12 towards end 14), and a second or "B" side 18 which is recorded in the other direction (from end 14 to end 12). Several recorded musical selections 20a, 20b, 20c, 20d, 20e, 20f, and 20g are recorded in sequence on the tape 10. In this embodiment, these selections are stereo recordings, and the selections each appear as pairs of tracks. These musical selections are preceded by respective blank intervals 22a, 22b, 22c, 22d, 22e, 22f, and 22g so that there is a silent or unrecorded space or gap following each of the selections 20a-20g and preceding the next.

As also appears in FIG. 1, intervals 24 and 26 are provided at the beginning of the "A" and "B" sides 16 and 18, near the ends 12 and 14, respectively. A block 30 of recorded selection data is located within each of these intervals 24 and 26. In a preferred embodiment, the data blocks 30 for each of the intervals 24 and 26 are identical, and each identifies the artist, title, and location (i.e., track number or selection number) for the selections 20a–20g located on both sides 16 and 18 of the tape 10. However, in alternative embodiments, the data block 30 for each interval 24 or 26 would contain the selection information concerning only the musical selections recorded on the respective A or B side 16 or 18 of the tape 10.

Figure 2:
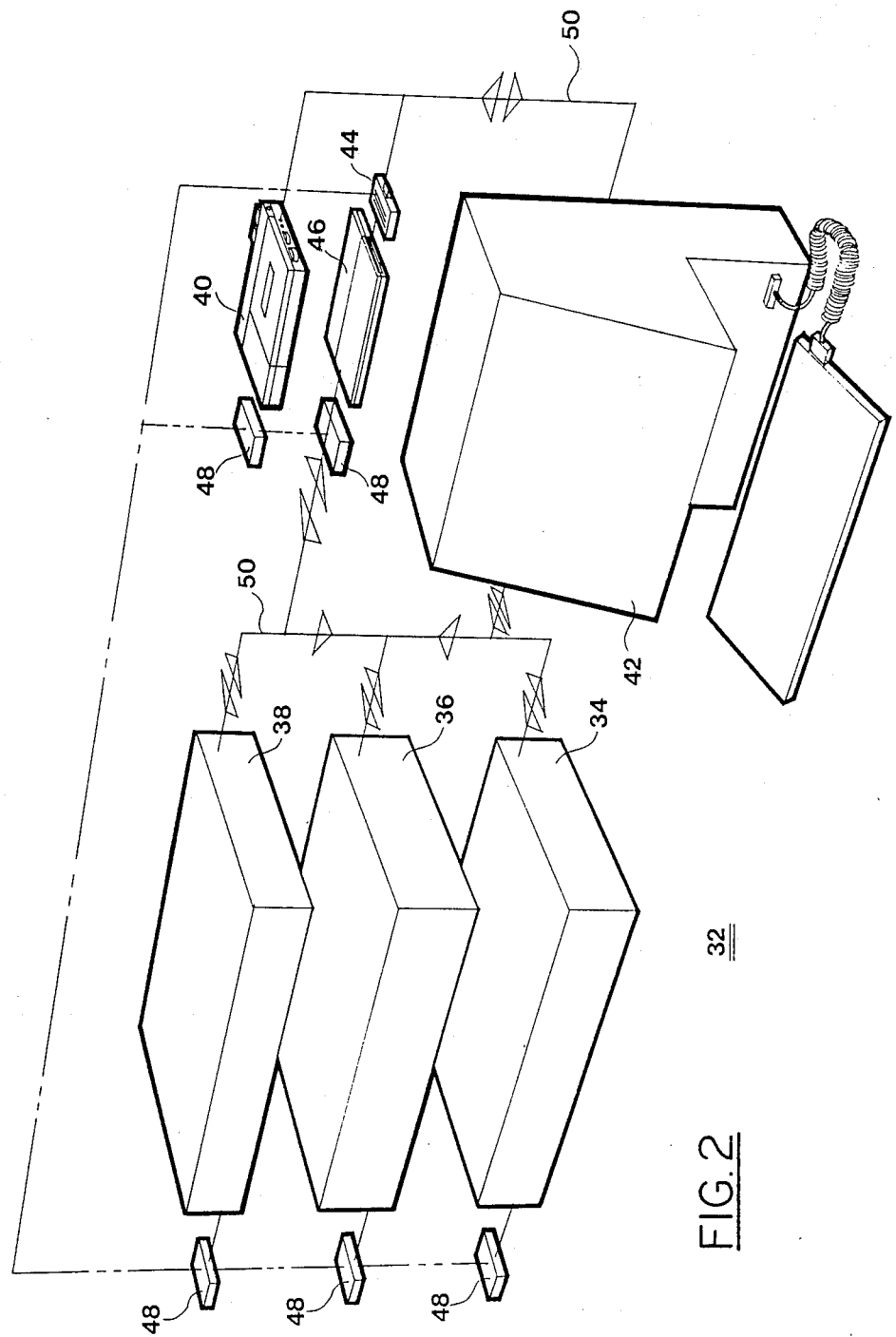
FIG. 2 is a systematic diagram of an audio system including recorder/player embodying this invention.

FIG. 2 illustrates schematically an electronic audio system 32 that incorporates the features of this invention. The system 32 has a linear or analog turntable, tuner, or amplifier 34 providing audio power to speakers (not shown), a cassette deck 36 and a laser disc (CD) player or deck 38. A portable cassette player 40 is connected to a computer data terminal 42 by means of a "smart" connector 44. This connector can be of the type described in my earlier patent application Ser. No. 775,315, filed Sept. 12, 1985. This "smart" connector 44 plugs into an external programming and display device 46, which can be in the form of a notetaker unit, also as described in my earlier patent application No. 775,315. Interchangeable memory units 48, which are plug-in random access memories (RAMs), and preferably of the type also described in my earlier patent application No. 775,315, can plug into the external programming and display device 46, as well as into the other components, for interexchange of data. Interconnection lines, generally shown as 50, provide power, audio, and data communication among the various elements 34, 36, 38, 40, and 46 of the audio system 32, as well as data connection to the computer data terminal 42.

The data terminal 42 can be a point-of-purchase unit, for in-store entry of the title, artist and other data onto a cassette or other tape at the time of purchase. The data can be keyed in, but preferably are read in from a large system memory, or read automatically from a machine-readable UPC code or the like. The data terminal 42 can also be coupled to the retail store's inventory control system to keep track of sales of merchandise by artist, song titles, etc., as well as by volume of album sales.

In this arrangement, title information for a tape cassette on the tape player 36 or on the portable tape player 40 are entered and displayed either on the external programming and display device 46 or on the console of the computer data terminal 42.

Figure 3:
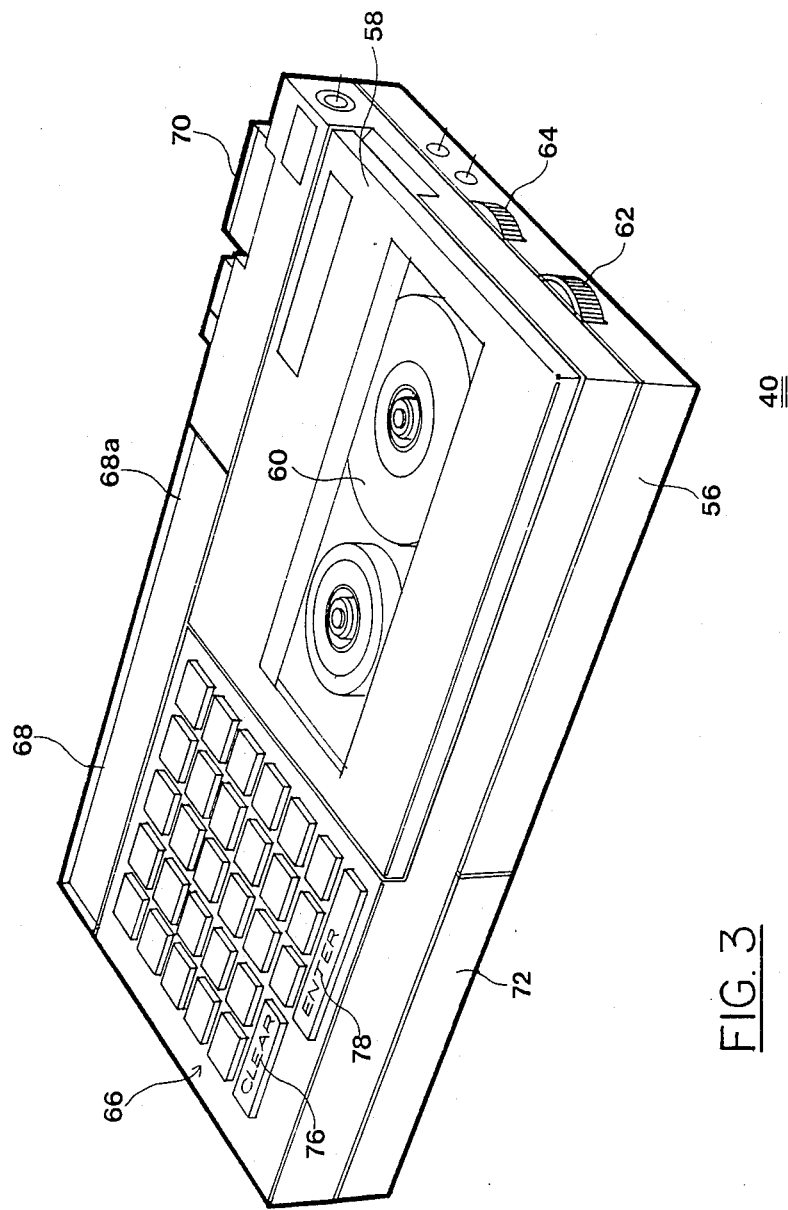

A portable tape player 40 of the personal headset type (i.e. "Walkman"), as shown in FIG. 3, incorporates the features of this invention. This cassette player 40 has a case or housing 56 having a cassette compartment 58 for containing a standard audio tape cassette 60. The player 40 has a suitable magnetic pickup head, reel hub drive, capstan drive, and motors for powering these, which are of standard configuration, and not shown here. The player has a volume control knob 62, a balance adjustment knob 64, and alphanumeric keyboard 66 formed on the front surface of the housing 56, and a built-in LCD (liquid crystal) display 68 shown here as a panel incorporated into the housing 56 above the keyboard 66. A tape counter display 68a is incorporated on one end of the display 68.

Also shown are appropriate control push buttons 70 for effecting play, record, fast forward, and pause modes, and a battery compartment 72.

Among the keys of the keyboard 66 are a clear key 76 and an enter key 78.

In this version, one line of memory at a time is displayed on the LCD display 68, corresponding to the title information (that is, the artist, title, album name, or other information) identifying the recorded selection, as well as the selection number or track number. Simply pushing the enter key 76 will cause the tape player 40 to seek out the beginning of the recorded selection that corresponds to the information presently being displayed on the LCD display 68.

The keyboard 66 in this embodiment permits the user to "program" the tape cassettes. That is, the user can key in the title information, (title, artist, etc.) and then record automatically the keyed information on the beginning of the tape.

The keyboard 66 is also configured so that certain of its keys correspond to the following functions: "MEMORY", "ARTIST", "TITLE", "FILE", "SCROLL UP", and "SCROLL DOWN".

FIG. 3A is a variant of the FIG. 3 embodiment. In addition to alpha-based functions, numeric designations can also be entered using its keyboard 66a and its clear C/CA key 76a, enter key 78a, track select keys 75, file key 77, and shift key 80. This version has the advantage that it can be programmed with selections that are played in the order of their selection, rather than simply playing what is displayed when the enter key 78 is depressed.

Figure 4:
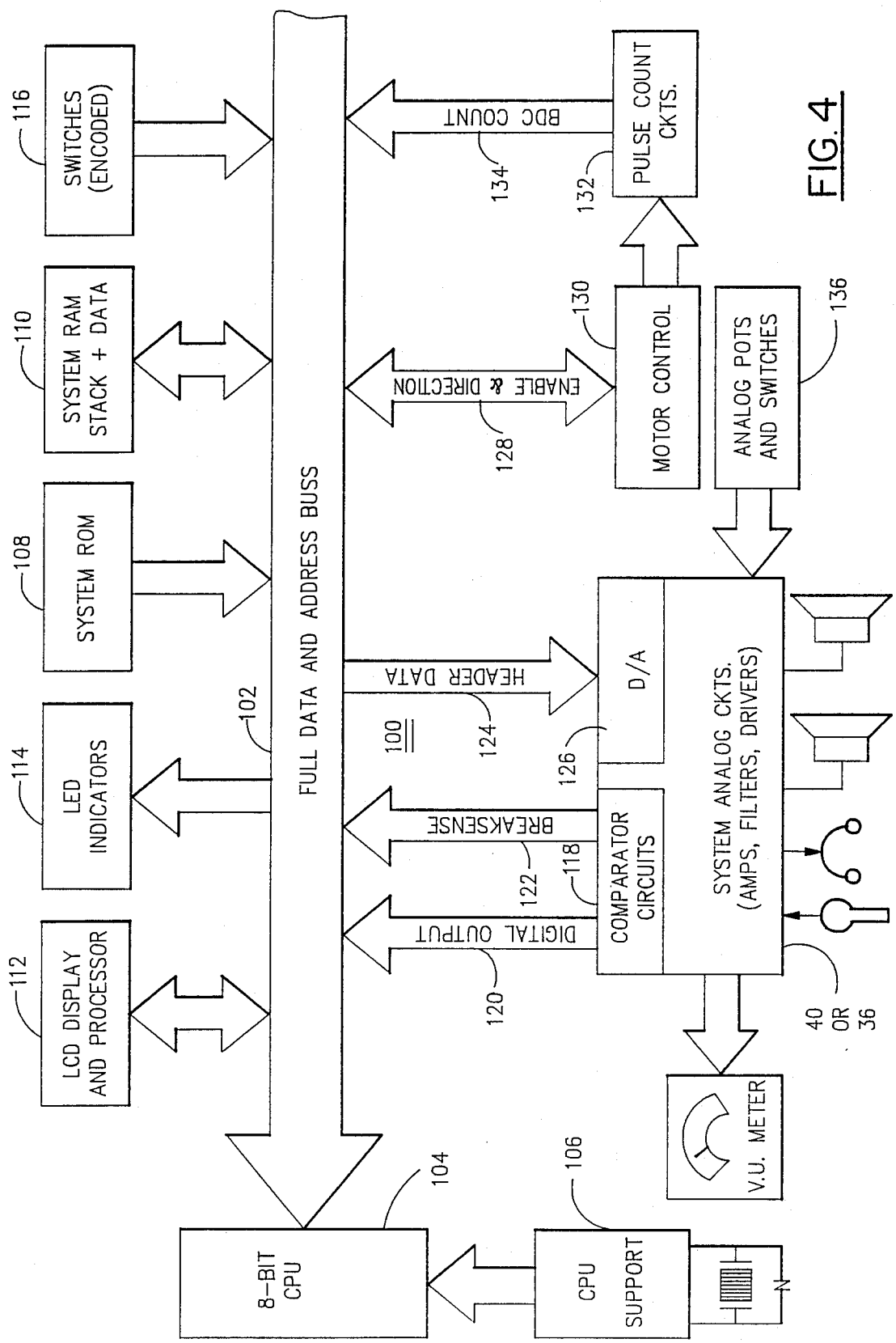
FIG. 4 is a system architecture diagram of the apparatus according to an embodiment of this invention.

FIG. 4 shows the system architecture layout for the music selection display and control circuitry which is incorporated into the tape player 40 or the cassette deck 36. This circuitry 100 has a data and address bus 102 with a data capacity of eight-bit width, plus address and control lines adapted for memory mapping and I/O decoding. An eight-bit CPU 104 is at the heart of the digital control system for the circuit 100, and this CPU 104 reads the header data 30 at the beginning of the tapes, writes the data header 30 onto the tapes, reads the various control switches, controls, keys, and push buttons, drives the display 68, and controls the tape drive motor. An ancillary CPU support circuit 106 includes such components as clock and timing circuitry, and other associated hardware.

A system ROM 108 contains the system program and all of the data constants required to control the circuit 100. This system ROM 108 is an address-coded memory block which is directly connected to the data bus 102.

A system RAM 110, including both stack and data memories, is directly connected to the data and address bus 102. This system RAM 110 includes both system working memory and buffer, directory buffer, and the system stack memory.

An LCD display and processor unit 112 is ported to the bus 102 and receives control and ASCII codes from the CPU 104. This display circuit 112 can be incorporated within the display unit 68, and can include an onboard display processor and display drivers.

Various LED indicators 114 are driven by memory-decoded latches connected to the bus 102.

Various keys, control switches, and pushbuttons 116, including those of the keyboard 66, are connected to the bus 102 by means of tri-state buffers. These buffers (not shown) are also connected to a memory-map I/O port of the bus 102.

As part of the linear or analog recording and playback circuitry of the recorder 40 or deck 36, or externally coupled to it, are a signal conditioning and comparator circuit 118 connected to the data bus 102 by means of a digital output port 120 which reads the header data, and a break sense output circuit 122. The digital header data block 30 is provided from the data bus 102 over a header data input 124 to a digital input to analog converter 126, i.e., in the deck 36 or player 40.

The break sense circuitry output circuit 126, here contained in the deck 36 or player 40, provides a signal to a memory-mapped I/O port 122 whenever a "break" or unrecorded gap 22a-22g on the tape is detected.

The deck 36 or player 40 has appropriate analog outputs for a VU level meter, headset, and speakers, as well as a microphone input, as is conventional.

When the header data 30 is picked up in the deck 36 or player 40, the data 30 are read from the tape and the signals are conditioned in the circuit 118 and supplied through the bus 102 to the system RAM 110. The CPU 104 accesses the data stored in the RAM 110 and supplies he artist and title information through the display processor 112 to the LCD display 68 or the equivalent. Enable and direction leads 128 connect the bus 102 to motor control circuits 130 which, in turn, are coupled to a pulse counter 132 which supplies tape count information through a binary count output 134 to the bus 102. The motor control circuit 130 controls the speed and direction of the supply and takeup hub drive motor and the capstan motor for the deck 36 or player 40. The system RAM 110 keeps track of the number of binary count pulses provided from the circuit 132, and thus keeps track of the actual position of the tape 10. The CPU 104 compares the stored count of these binary pulses with the location data stored in the RAM 110 that was read from the recorded data block 30 stored on the tape 10. When a particular music track is selected, the circuit 110 causes the deck 36 or player 40 to fast-forward until the position data agrees with the counted pulses provided from the pulse circuit 132. Then, at the next silent gap or break 22a-22g detected and supplied through the break sense circuit output 122, the deck 36 or player 40 will commence a playback operation automatically.

To complete the disclosure of the device, numerous potentiometers and switches 136 are shown to be incorporated in the deck 36 or player 40, and these provide inputs for volume control, tape type selection (FeO, CrO, etc.), noise reduction, or other functions. The tape player can have an auto-reverse feature, or single sided operation.

Figure 5:
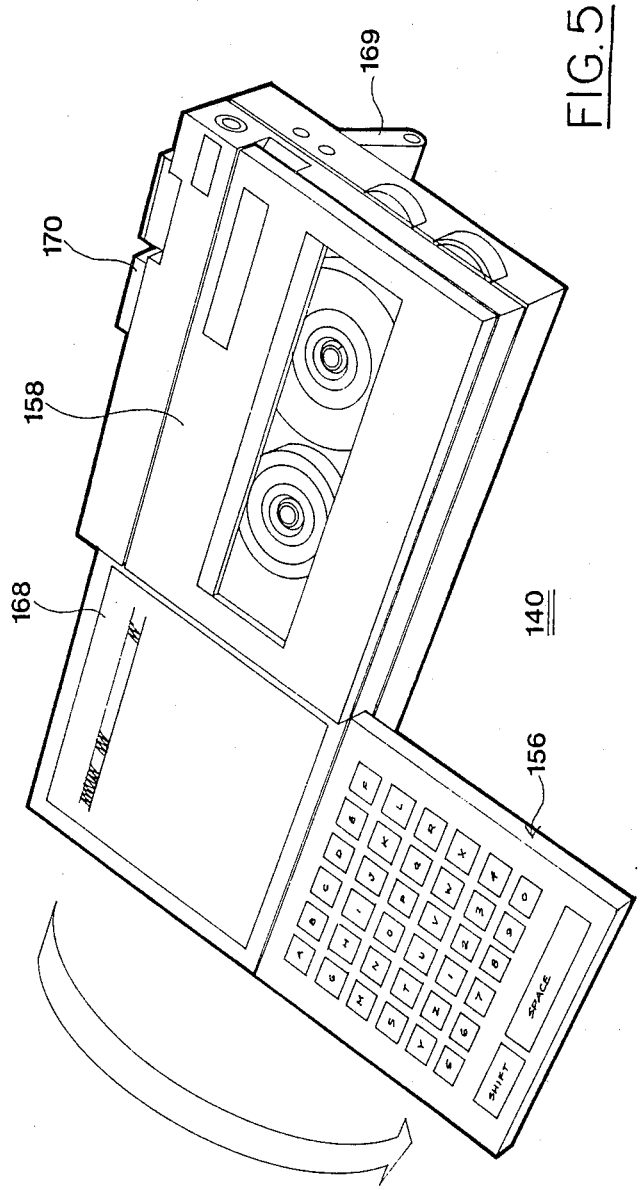
FIG. 5 is a perspective view of another embodiment of this invention.

FIG. 5 shows another tape player 140 according to an embodiment of this invention. In this embodiment, elements which correspond to similar elements in the embodiment of FIG. 3 are identified with similar reference numbers, but raised by 100. Furthermore, in the description of the further embodiments which follow, similar elements are identified with similar reference numbers, but raised by an additional 100, i.e. 240, 340, etc.

The device of FIG. 5 is a portable player/recorder 140, similar to that of FIG. 3, but with variations in the keyboard and display. In this embodiment, the player/recorder 140 has a flip-down keyboard 166 and an enlarged display unit 168. The keyboard 166 flips up when not in use to cover and protect the display unit 168. This also prevents accidental actuation of any of the keys of the keypad 166. An elevation foot 169 which is swingably attached to the bottom or base of the player/recorder 140 elevates the player/recorder 140 so that the display 168 is at a more readable angle. This foot 169 folds down to store flat when not in use.

Figure 6:
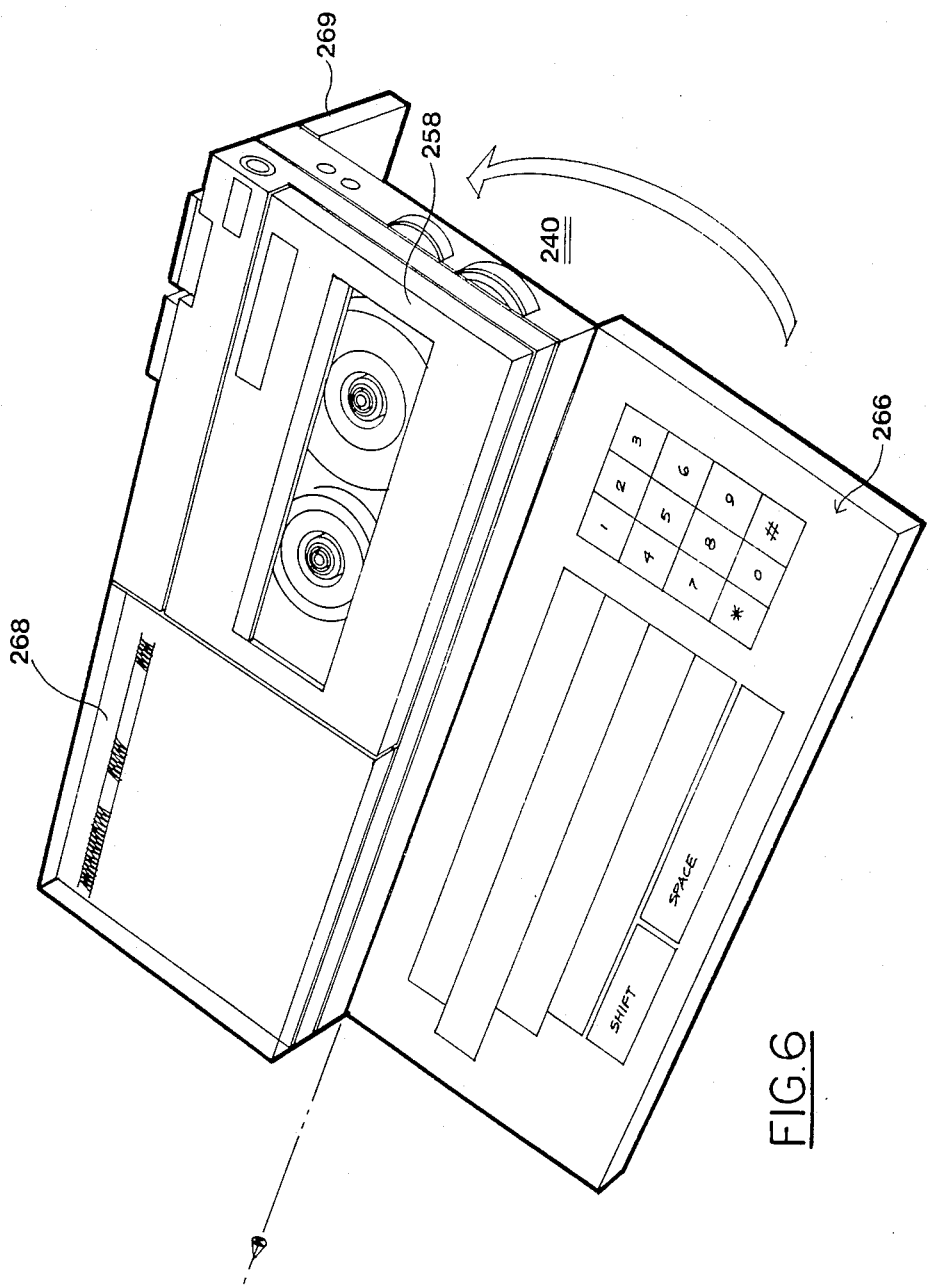
FIG. 6 is a perspective view of a further embodiment of this invention.

FIG. 6 shows a recorder/player 240 similar to the player 140, but with a full-width keypad 266 which flips out from below the unit. The display size and format of the display 268 remain the same size as in the previous embodiment. The keypad 266 could alternatively slide out, or could fold forward and over atop the cassette compartment 258 and display area 268 for protecting the keypad 266 in display area 268 from damage and inadvertent actuation.

FIG. 7 shows yet another variation, in which a tape player 340 has an abbreviated keypad 366, including an artist key 371, a title key 372, a scroll up key 373, a scroll down key 374, ten numerical track number keys 375, a clear key 376, a file key 377, and an enter key 378. The key controls of this embodiment are simplified and reduced in number.

The artist, title, and file keys 371, 372, and 377 organize the music tracks. The scroll keys 373 and 374 scroll through the memory for artist or title heading, so that the display 368 will identify what items are located under a particular heading. Each selection under an artist or title has a numerical designator for the track number identifying the space on the tape which it occupies. The track number is selected in the order in which the user desires the music to be played. A single depression of the clear key 376 clears the last entry, and two successive depressions of this key 376 clear all selections made. Here, tracks can be entered as any combination of four digits, i.e., 0000 through 9999. While it is unnecessary to keep track of this many selections on a single cassette loading machine, the function is quite valuable for multiple cassette loading units.

Figure 7A:
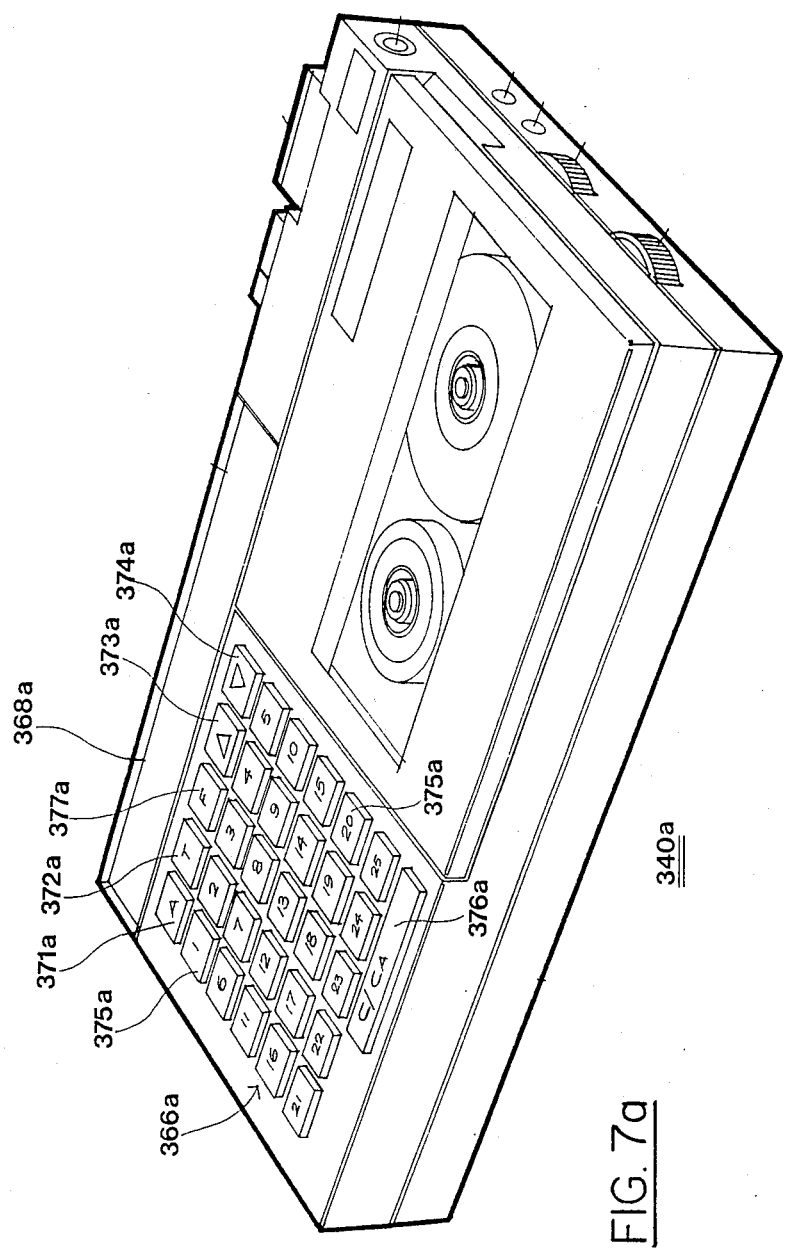

The player/recorder 340 as shown in FIG. 7A permits direct track selection of the music tracks associated with the cassette presently being displayed on the display 368a. This version produces a display that reads, for example, "C#(Cassette number) 12 - Track #1, Collins, Judy, BREAD AND ROSES. This version does not permit multiple cassette preprogramming.

Figure 7B:
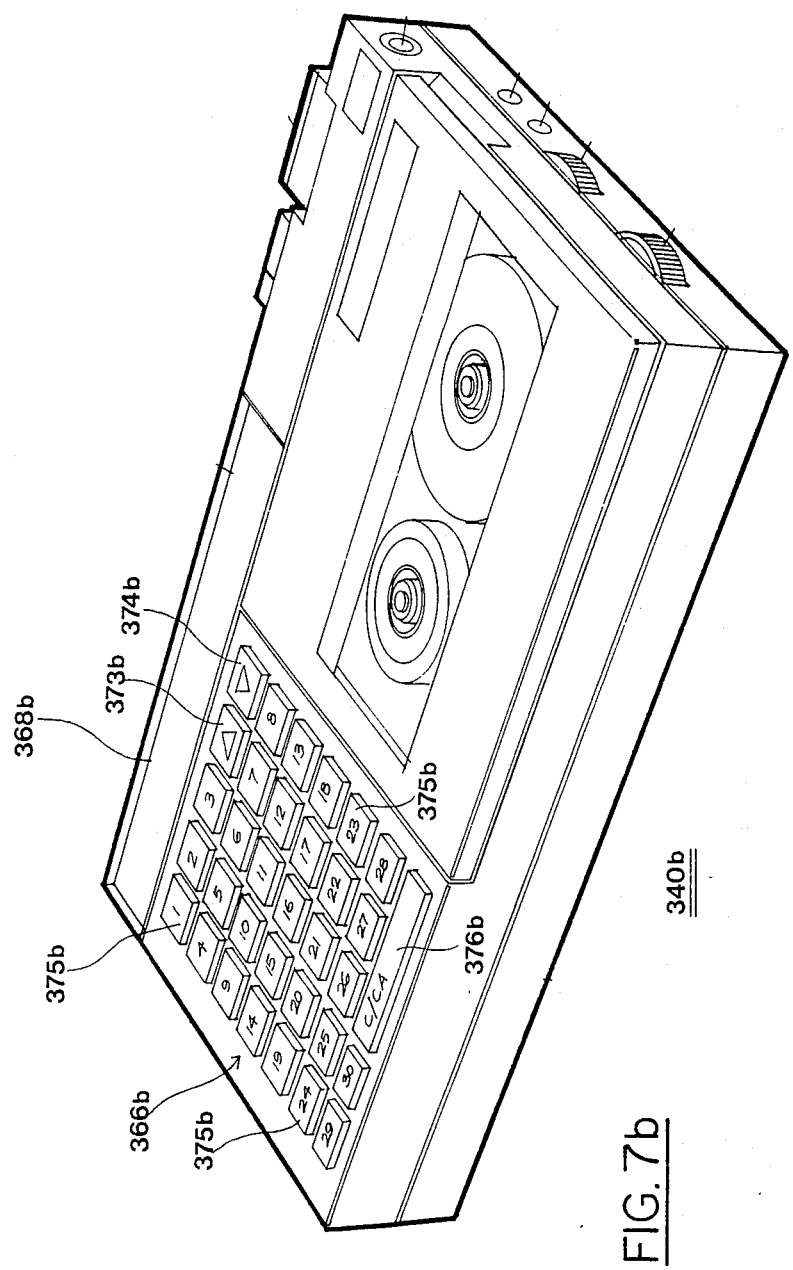

FIG. 7B illustrates another version of the recorder/player 340b, which omits artist, title, and file memory systems but instead incorporates a simple buffer system that simply reads the tape leader and transfers the header information into temporary storage in a buffer memory. The data in the buffer are displayed on the display 368 for subsequent direct track selection by the user. After the tape cassette is removed, the buffer memory dumps the header information, and is ready for the next cassette. This version has the advantages of economy and simplicity.

Figure 7C:
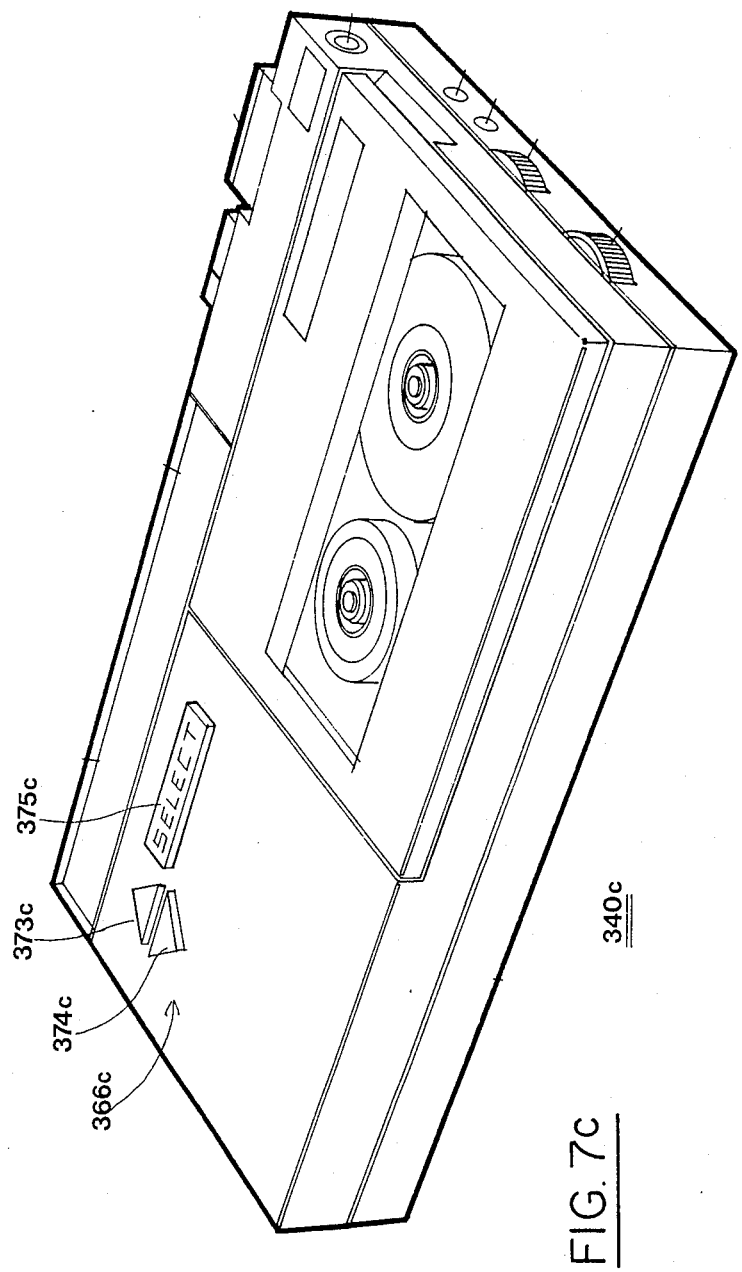

FIG. 7C shows a further simplified version of this recorder player 340c which has on its keyboard 366c simply the scroll keys 373c, 374c, and the select key 375c. In this version, the buffer memory contents are displayed one line at a time and the select key 375c is depressed to select the order of playback. When all selections are programmed, a second depression of the select key 375c commences playback.

Figure 8:
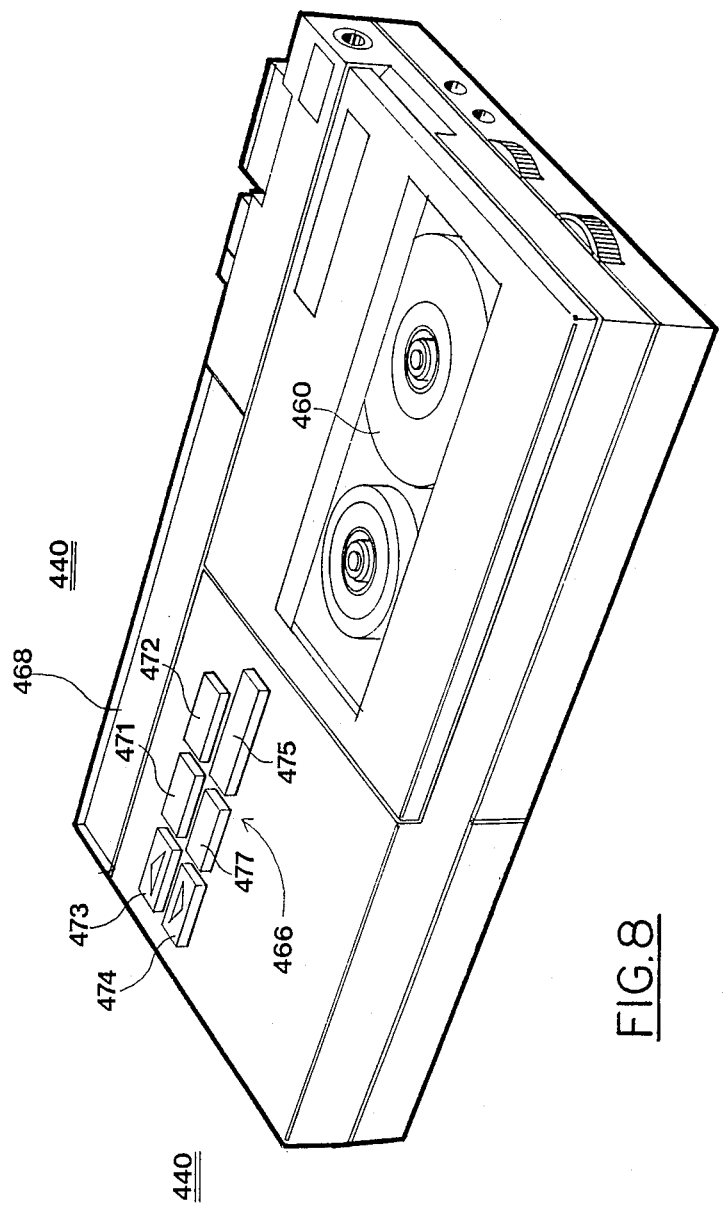
FIG. 8 is a perspective view of yet another embodiment of this invention.

FIG. 8 shows another variation in which the tape player/recorder 440 has a more abbreviated keyboard containing only an artist key 471, a title key 472, a scroll up key 473, a scroll down key 474, a file key 477, and a select key 475. Here, depressing the artist, title, or file key 471, 472, or 475 selects the music tracks. If the artist key 471 is depressed, then a particular artist, for example, "Judy Collins", is found from among many artists on file, by using the scroll keys 473 and 474. A second level is selected by depressing the file key 477 and all of the titles listed under "Judy Collins", their playing times, track numbers, etc. are displayed on the display 468. A desired selection is made by depressing the selection key 475 when the desired musical selection is displayed.

Figure 9:
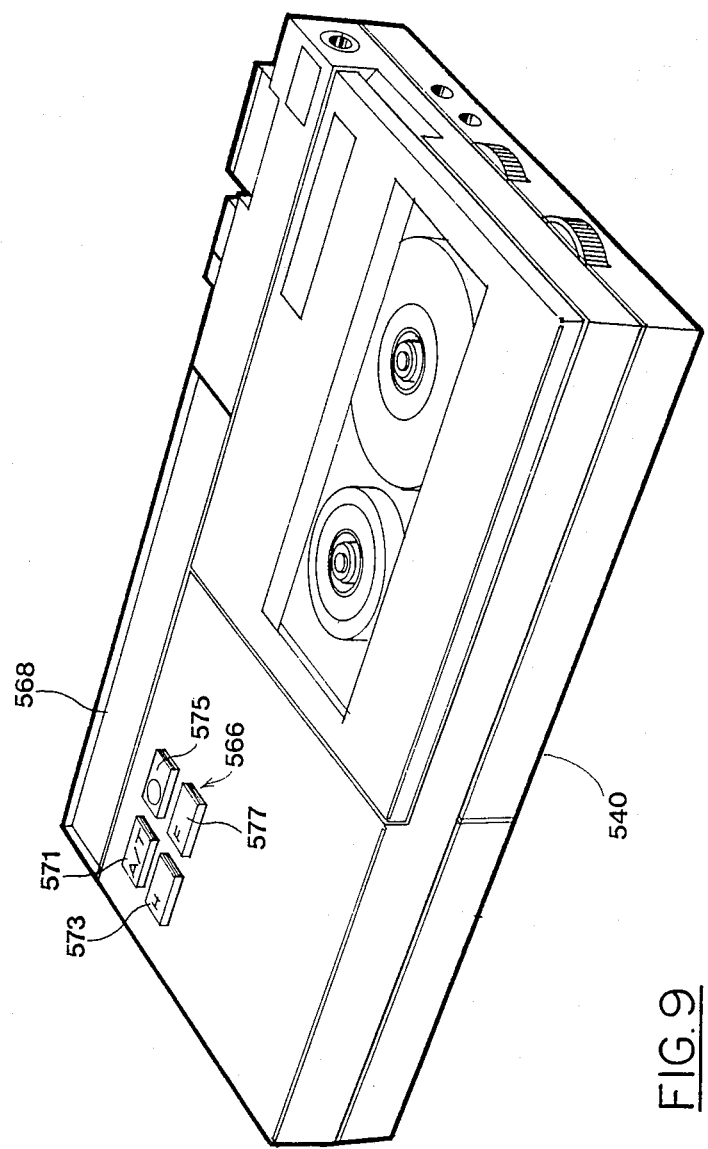
FIG. 9 is a perspective view of a still further embodiment of this invention.

FIG. 9 shows another player/recorder 540 having a variation in its mode of control, so that the number of push buttons or keys is further simplified and reduced. Here, a four-key cluster 566 has only an artist/title key 571, a select key 575, a heading key 573, and a file key 577. Selection of artist or title data is accomplished by depressing a single key, namely the artist/title key 571 when the type of information presently displayed is not desired. An artist or title selection mode indicator can be included on the display 568 as a prompt. The heading key 573 scrolls the artist or title file data forward only through the display and the file key scrolls the data under the artist or heading title forward only through the display in the same manner. When a final selection is located, the user depresses the select key 575 to cause the player/recorder 540 to play the desired track on the cassette tape in the order of selection.

Figure 10:
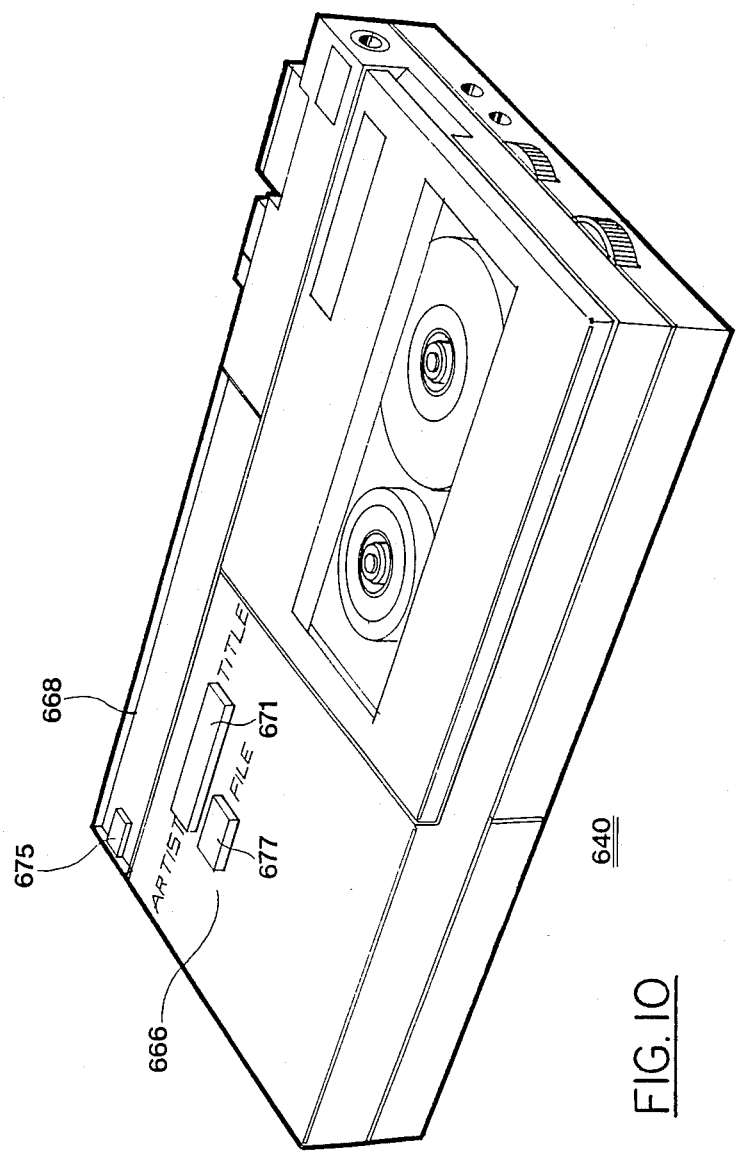
FIG. 10 is a perspective view of another embodiment of this invention.

FIG. 10 shows still another variation in which a recorder/player 640 has a still further reduced number of keys, to wit, a two-key cluster 666. Artist and title headings are selected by a single artist/title key 671 and file data under a particular artist or title is selected by a file key 677. All displayed selections listed under artist, title, or file are scrolled forward only. Final selection is made by a select key 675 which is situated on the display 678.

Figure 11:
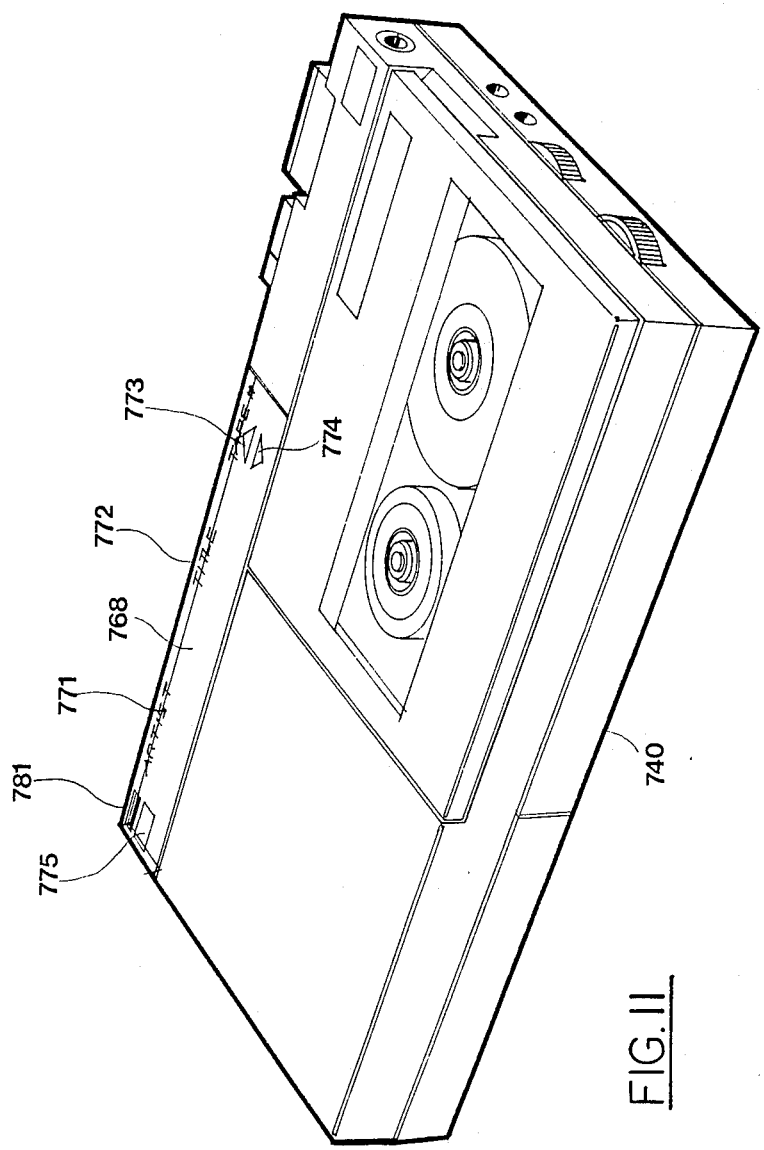
FIG. 11 is a perspective view of a yet further embodiment of this invention.

A still further variation is shown in FIG. 11, in which a recorder/player 740 has a display 768 with touch sensitive controls incorporated into it. Here the display 768 has a track select area 775, a file display indicator 781, an artist select area 771, a title select area 772, and a scroll up/down area 773 and 774. All of these areas are, in effect, touch-sensitive controls. The "file" function is selected by touching the appropriate heading area, that is, the artist or title select area 771 or 772 after the desired heading data have been located (e.g., the desired artist name). The second activation by touching will then bring up the file data under the selected artist or title. A feedback or prompt to indicate this is provided on the file display indicator 772. The final track selection is made by touching the track select area 775.

Figure 12:
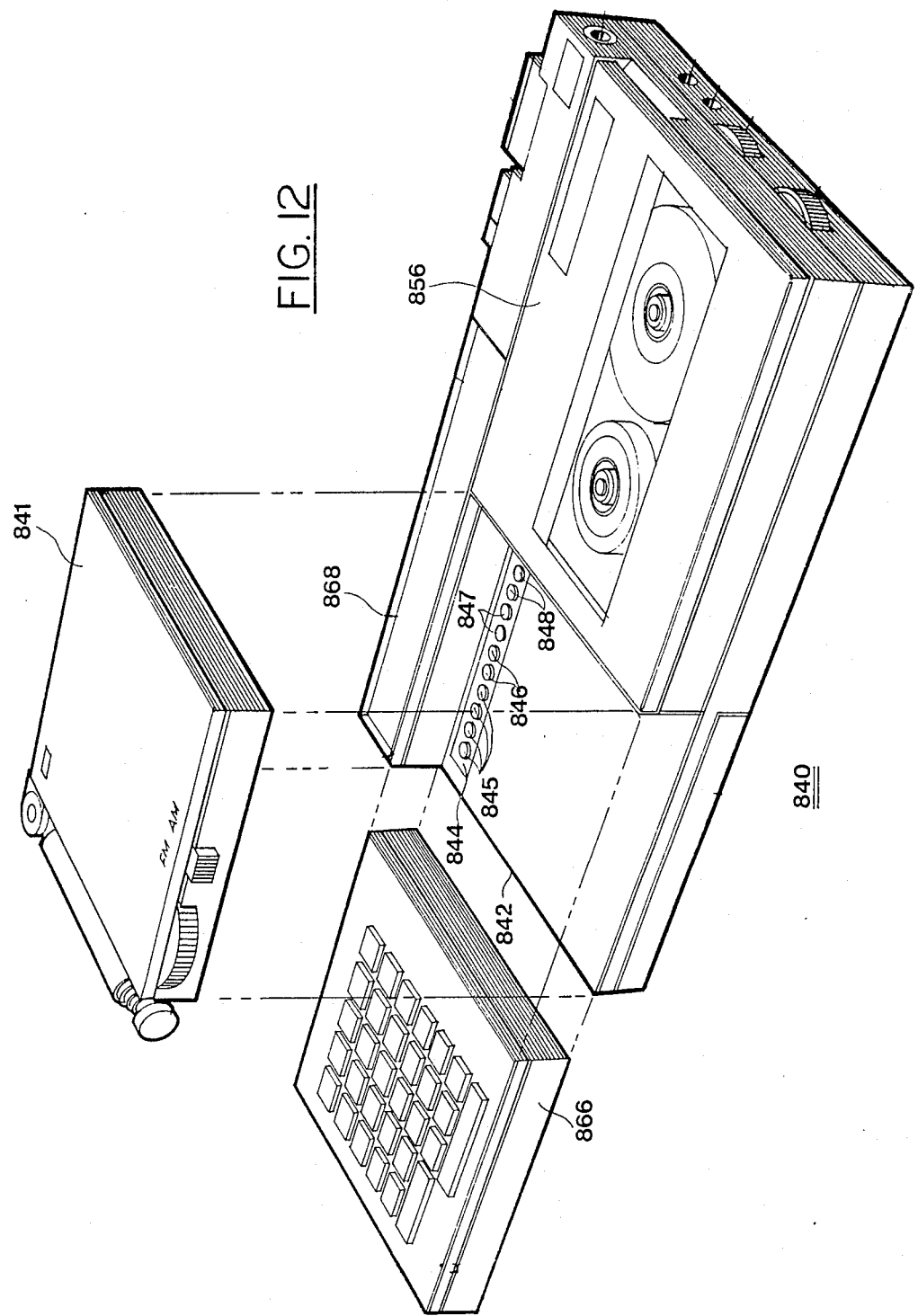
FIG. 12 is a perspective view of a still further embodiment of this invention, incorporating modular control units.

A modular system embodying this invention is shown in FIG. 12. A tape player 840 has a built-in LCD display 868, which can include a tape counter display, and has a modular removable AM/FM tuner 841 which fits into a recess 842 to the left of the tape cassette compartment 856. In the recess there is a contact strip 844 with appropriate data contacts 845, stereo signal contacts 846, power contacts 847, and display contacts 848.

An interchangeable or modular keypad 866, which in this embodiment is functionally equivalent to the keypad 66 of the first embodiment, can be interchanged with the tuner 841 to effect an automatic tape playing mode.

Figure 13:
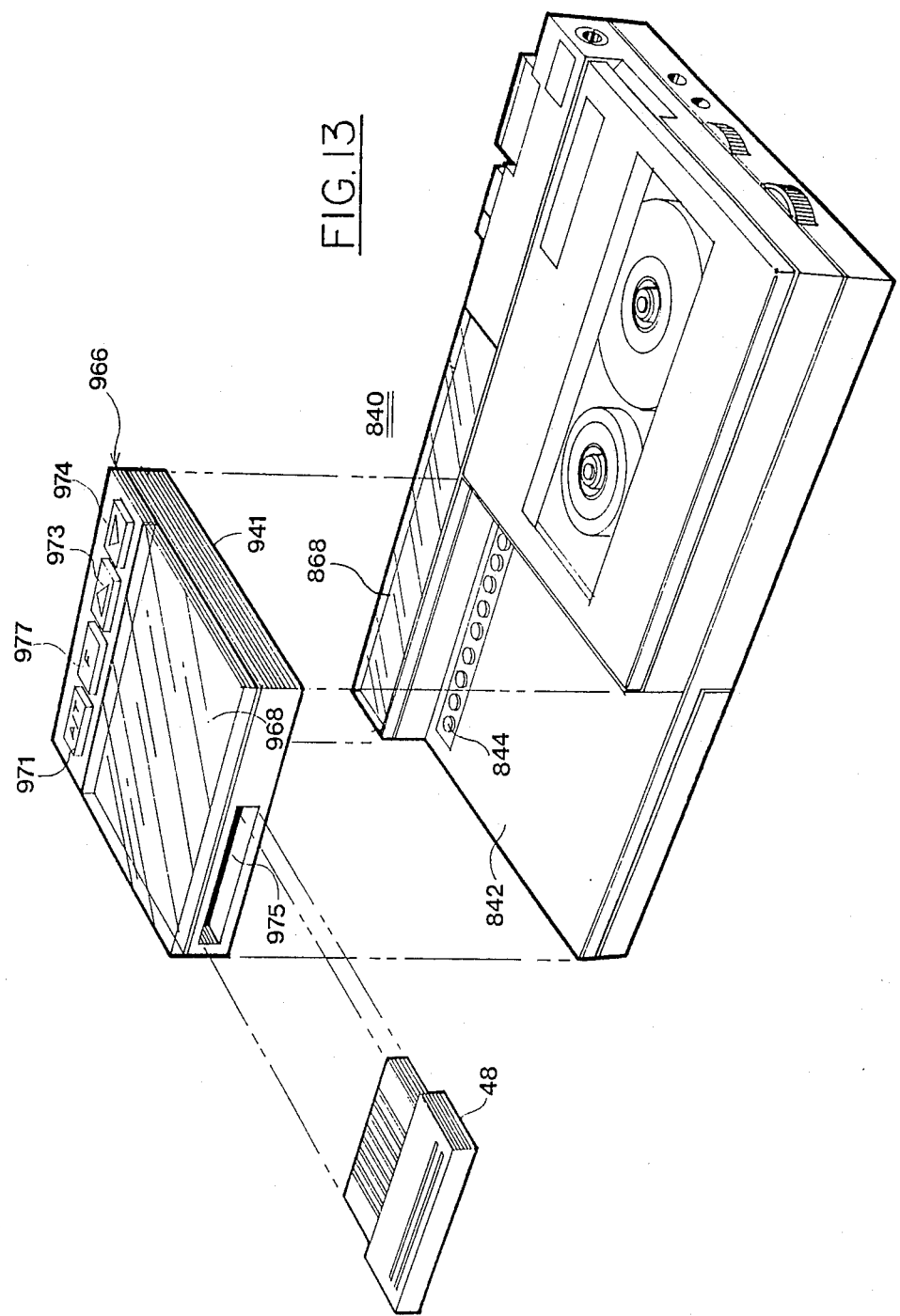
FIG. 13 shows a variation of the above embodiment of this invention.

As shown in FIG. 13, a modular music memory module 941 can be employed instead of the modular keypad 866, and fits the recess 842 and the power contact strip 844 of the player/recorder 840. The module 941 has a full-size display 968 and a reduced keypad 966, which includes an artist/title key 971, a file key 977, and up and down scrolling keys 973 and 974. Further incorporated in this music memory module 941 is a socket or adapter 975 which receives a removable or interchangeable memory or RAM module 48, which, as aforesaid, is of the type described in my earlier patent application No. 775,315. This feature permits increased memory capacity.

Figure 14:
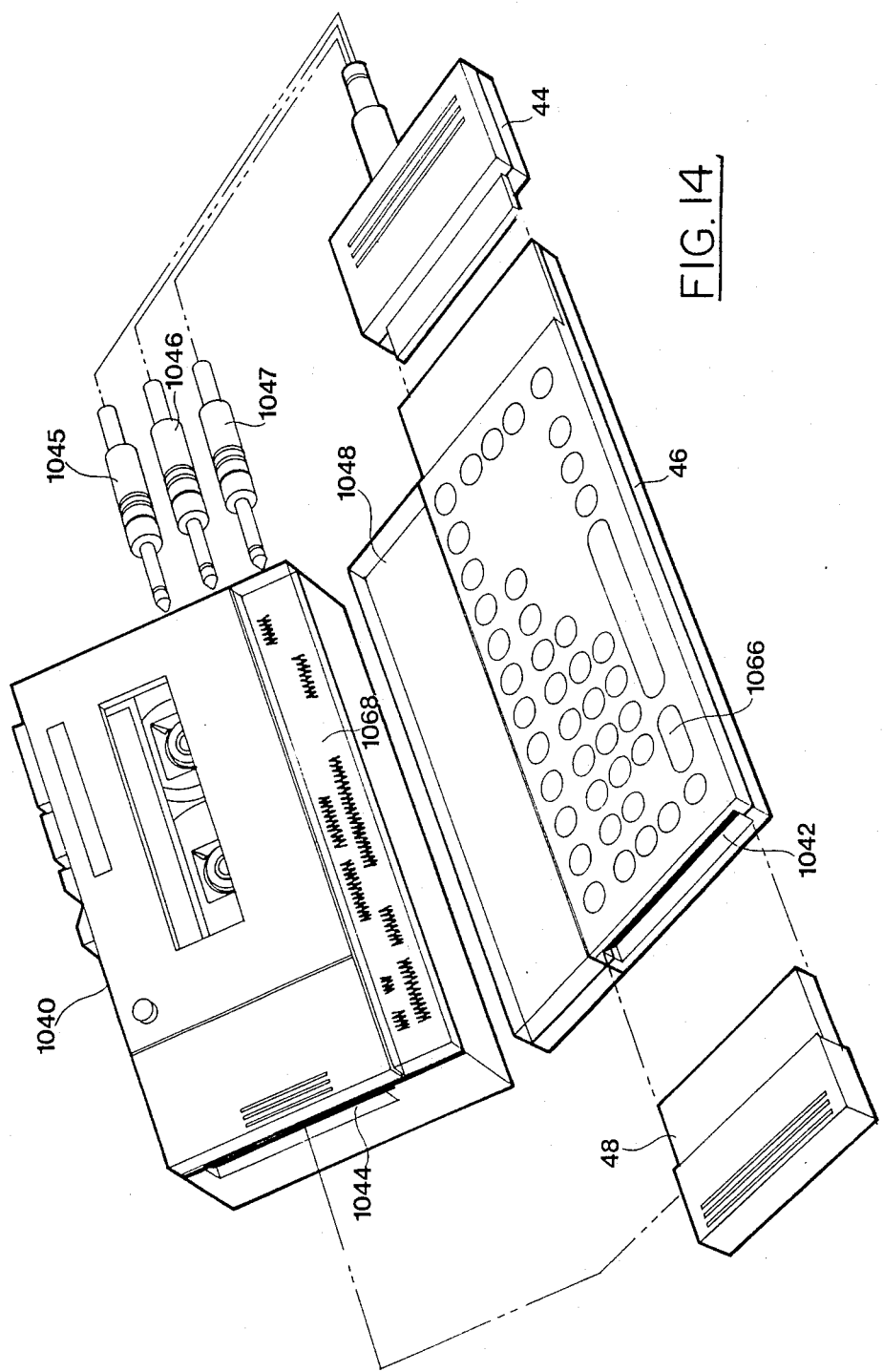
FIG. 14 illustrates still another embodiment of this invention.

FIG. 14 shows a recorder/player 1040 with a break sensing capability and having auxiliary input (microphone) and output (earphone) jacks, as well as a remote jack to permit fully automatic starting and stopping in the forward and reverse modes. The recorder/player here shown is optionally provided with a display 1068. In this embodiment, an external programming and display device 46, which can be of the "notetaker" type as described in my earlier patent application No. 775,315, is coupled to the recorder/player 1040 by means of smart connector 44. The smart connector 44 is connected by cables to auxiliary earphone, microphone, and remote plugs 1045, 1046, 1047, respectively fitting the earphone, microphone, and remote jacks in the recorder/player 1040. The external notetaker type device 54 is a hand-held unit having a complete alphanumeric keyboard 1066 and a full width display area 1048. The hand-held notetaker type device 46 permits external control input for the user to write in the artist, title, and location data onto the tape header, as well as into its own memory. Data can also be transferred from the tape recorder/player 1040 through the smart connector 44 into the notetaker type programming and display device 46.

As is also shown in FIG. 4, a plug-in interchangeable RAM module 48 can be inserted into a socket 1042 on the programming and control device 54 to increase its internal memory capacity. A similar socket 1044 is optionally included in the recorder/player 1040.

The stereo player/recorder 1040 of this embodiment with the auxiliary programming and control device 46 and with its interchangeable memory module 48 enables either stand-alone or integrated operation of both units.

Figure 15:
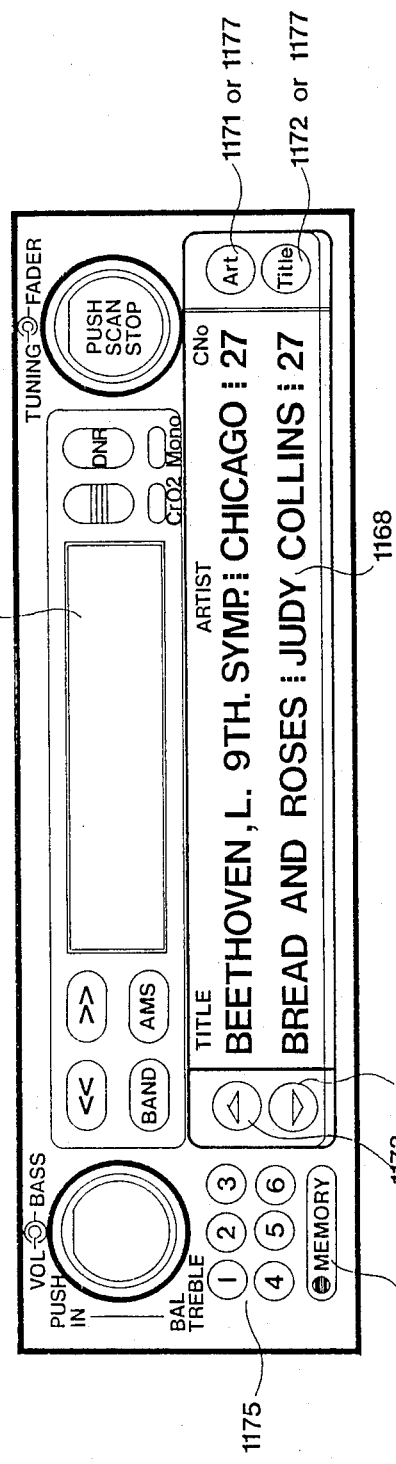
FIG. 15 is a front view of a dash-automotive cassette player according to an embodiment of this invention.

FIG. 15 illustrates another embodiment of this invention, here an in-dash or under-dash-mounted automotive stereo cassette tape player 1140, of the type which may be found in the driver's compartment of an automobile or truck, or in the cabin of a boat, plane, or other motor vehicle. On the front of the tape player 1140 are disposed a plurality of track selection keys 1175 and a memorize key 1167, a display 1168 situated beneath a cassette port 1156, up and down scrolling keys 1173 and 1174, and artist and title selection keys 1172. The artist key 1171 and title key 1172, the scrolling keys 1173 and 1174, and the track selection keys 1175 function generally as described above with previous embodiments. A memorize entry key 1167 stores the desired selections for future reference in a "library" i.e. a RAM memory. As shown, the display 1168 can show, as title information, the title (in one case identifying the composer as well), the artist or orchestra, and the cassette number. A file function 1177 is selected by depressing the relevant keys 1171 or 1172 twice (push-push).

The remaining controls are standard with most automotive tape players, but may vary in configuration from one model to another.

FIG. 16 shows another automotive tape player 1240 which has a remote selecting device 1265 including a display 1268 and a keypad 1266, including keys similar to those found on other embodiments. A programmer connector 1272 connects the remote device 1265 by cable or wire to the tape player 1240, preferably by means of another similar plug-in program connector (not shown).

Figure 18B:
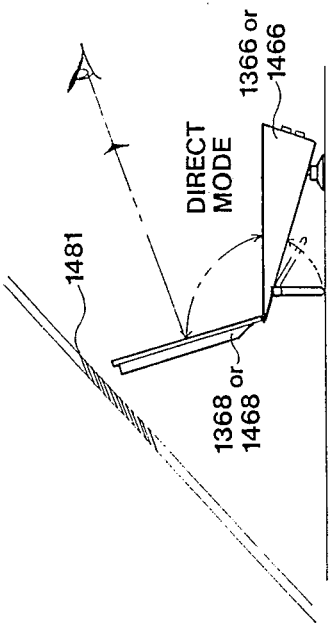
Figure 18A:
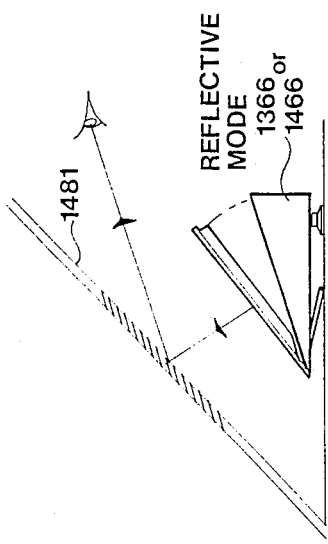

FIGS. 17 and 18 show dashtop mounted display units 1366 and 1466, respectively, which have heads-up display elements 1368 and 1468. These display units provide mirror-image displays which are reflected in the windshield 1481 (FIGS. 18A and 18B) so that the operator of the automobile or other vehicle can see the information concerning the recorded selections on the tape in the tape player 1240 without taking his eyes from the road. These display elements 1368 and 1468 tilt for the optimum reflection angle. A backlighting unit latch 1368c or 1468c is disposed on the front of the element 1368 or 1468. The heads-up remote display unit 1366 has resident scroll up and scroll down keys 1373, 1374, track select keys 1375, a memorize key 1367, an artist key 1371, and a title key 1372. Suction cup feet 1390 provide temporary mounting onto the dash top of the automobile or other vehicle. The display unit 1466 of FIG. 18 is quite similar, but has no resident controls, which are optimally provided on the tape player 1240 or elsewhere.

These heads-up display units 1366 and 1466 contain back-lighting elements which serve two functions. These permit night illumination for the heads-up reflective display mode shown in FIG. 18A, and also permits direct viewing, with the display element 1368 or 1468 completely opened as shown in FIG. 18B.

FIG. 19 shows yet another variation embodying this invention, in which a home cassette deck 1536 is equipped with a resident auxiliary control, memory, and display device 46, in addition to the usual cassette compartment 1538 and tape recorder/player controls 1540. The auxiliary control, memory, and display device 46 is a plug-in module and can be employed in the resident position, plugged into the host unit cassette deck 1536, or in a remote position, here shown in the foreground of this drawing view. The device 46 is connected by wire, infra red link, UHF link, etc. to the cassette deck 1536. The device 46 (FIG. 19A) can be configured generally of the notetaker configuration, of the type described in my earlier patent application No. 775,315. As the device 46 is entirely portable, the tape recorded music selection functions can be carried out at any time and place that the user desires.

The data that are recorded on the leader or initial part of the cassette tape can be stored in the system memory on a permanent basis, if there is sufficient memory space, so that it is not necessary to repeat the scanning and entry process every time the cassette is inserted into the tape deck or tape player.

The data associated with the recorded tracks or selections can include several items to which others can be added or some of which can be omitted, as desired for a particular application.

A numerical designator, or alphabetic title identifying the tape or cassette can trigger a look-up table in the memory; this can cause a response of either "yes, the data associated with this cassette number or title has been previously scanned and entered into memory" or "no, the memory has not received and stored any data associated with this cassette or tape title or number". In the latter case, the operator has the option of having the data entered into permanent memory, or into temporary memory for display purposes only.

The displayed data can include artist's name, composer's name, recording group or orchestra, title of work, movement, BWV, Opus, or Köchel listing number, and track location (by break and/or tape counter location).

When the tape is loaded in the deck or tape player, and a playback mode is selected, the tape is automatically rewound to the beginning, and then forwarded to pick up the recorded header data. Then the numerical designator or cassette identifier name is sent to the electronic controls (i.e., "cassette #37" or "Beethoven: Seventh Symphony"). All data are recorded in ASCII. Then the remaining information on the header is transferred to memory: "New York Philharmonic Orchestra"- "Zubin Mehta, Cond." - "I. Poco sostenuto; Vivace"- "II. Allegretto"- "III. Presto; Assai meno presto"- "IV. Allegro con brio"- "Time: 8:07, 11:43, 13:34, 9:55, Total Time: 42:39: - "AGLI - 3966 - B"- "Track #1-6"- :Tape Counter Position: Track 2:237, Track 3: 654, Track 4: 932".

These data can be transferred into memory externally (i.e. from a UPC-coded portion of a record jacket or cassette cover, or from a library memory), or can be manually entered.

At a record store, for example, the data entry device can be tied into an inventory control computer or intelligent cash register cash and inventory system.

Data can be manually entered on the tape, or can be read in automatically from optic or magnetically coded master data sheets using available reader devices.

While this invention has been described in detail with respect to certain preferred embodiments, it should be understood that the invention is not limited to those precise embodiments, and that those embodiments are instead representative examples of the many modifications and variations which would present themselves to those of skill in the art without departing from the scope and spirit of this invention, as defined in the appended claims.

What is claimed is:

1. Recording and/or reproducing apparatus in which a plurality of music selections are serially recorded on a record medium, with a space being provided on said medium in which a block of data identifying the titles of said selections and their respective locations on the medium is recorded, comprising
    means for entering the title data and location data for each of the selections on said medium;
    memory means for storing said title and location data;
    means for transferring the stored title and location data as a block onto said space on said record medium;
    means for playing back the record medium and reproducing said title and location data and said recorded selections;
    means for transferring the reproduced title and location data associated with the recorded selections into said memory means;
    display means for displaying at least the title data stored in said memory means;
    selecting means for selecting a desired one of said recorded selections based on the displayed title data; and
    means for automatically advancing said record medium to the commencement of said desired selection based on the reproduced location data associated therewith and stored in said memory means.

2. Recording and/or reproducing apparatus as in claim 1 in which said medium is a magnetic tape cassette in which tape travels in each of two directions with some of said musical selections recorded on the tape to be reproduced in one direction the remainder of said selections are recorded on the tape to be reproduced in the other direction, and two said spaces are provided on said tape at opposite ends thereof and in advance of the selections to be reproduced, said spaces each containing said block of data identifying the titles and locations for the selections to be reproduced in both directions.

3. Recording and/or reproducing apparatus as in claim 1 wherein said apparatus is a cassette tape recorder/player and said medium is an audio magnetic tape cassette.

4. Recording and/or reproducing apparatus as in claim 3, further comprising interconnecting means connected to said memory means for coupling to a removable interchangeable memory unit, and a plurality of interchangeable memory units each of which is selectably connectable to said interconnecting means to store the blocks of data for a plurality of said magnetic tape cassettes.

5. Recording and/or reproducing apparatus as in claim 3 wherein said stored location data include binary count data representing the tape position of the commencement of each of the associated selections, and in which a blank break interval is provided in advance of each said selection; said apparatus further comprising counter means for measuring the position of said tape during advancement thereof; break sense means for detecting said blank break intervals moving therepast during advancement of the tape, and comparison means coupled to said memory means, said counter means and said break sense means for comparing the tape position binary count data with the measured position of the tape and commencing reproduction of the desired selection at a detected break interval when the measured position of the tape agrees with the associated stored binary count data.

6. Recording and/or reproducing apparatus as in claim 3, wherein the apparatus is a portable, battery-powered tape cassette recorder/player having a housing; said display includes a low-power display panel integral with the recorder/player and incorporated in said housing; and said selecting means includes a plurality of keys on said housing and manually actuated by a user in accordance with the data displayed on said low-power display panel.

7. Recording and/or reproducing apparatus as in claim 3 wherein said apparatus includes a point of purchase device in a retail or other sales location for entering said block of data onto pre-recorded tape cassettes.

8. Recording and/or reproducing apparatus as in claim 1 wherein said space on the medium for said block of data is provided ahead of the first of said serially recorded selections.

9. Record medium reproducing apparatus in which one or more musical selections recorded serially on a record medium are played back, with a block of data identifying the titles and locations of the recorded selections being recorded on said medium in a space provided on said medium comprising reproducing means for reproducing the recorded data and the recorded selections, including pick-up means and means advancing the medium therepast;
memory means for storing said title and location data;
means for transferring into said memory means the reproduced title and location data associated with said recorded selections;
display means for displaying at least the title data stored in said memory means;
selecting means for selecting a desired one of said recorded selections based on the displayed title data; and
means for automatically advancing said record medium to the commencement of said desired selection based on the reproduced location data associated therewith and stored in said memory means.

10. Record medium reproducing apparatus as in claim 9 wherein said apparatus is an audio cassette tape recorder/player and said medium is an audio magnetic tape cassette.

11. Record medium reproducing apparatus as in claim 9 wherein the apparatus is a portable, battery-powered tape cassette player having a housing; said display includes a low-power display panel integral with the tape cassette player and incorporated in said housing; and said selecting means includes a plurality of keys on said housing and manually actuable by a user in accordance with the data displayed on said low-power display panel.

12. Record medium reproducing apparatus as in claim 11 wherein said selecting means includes a full alphanumeric keyboard.

13. Record medium reproducing apparatus as in claim 12, further comprising a separate remote plug-in control device fitting a receptacle in said dash-mounted automotive cassette tape player, and wherein said memory means, said display means, and said selecting means are situated within said plug-in control device.

14. Record medium reproducing apparatus as in claim 11 wherein said selecting means includes at least one scroll key for scrolling up or down the title data displayed on said display panel, and a select key for actuating said automatic advancing means in accordance with the scrolled data being displayed when the select key is actuated.

15. Record medium reproducing apparatus as in claim 9 wherein the apparatus is a dash-mounted vehicular cassette tape player, including means for mounting in a receptacle provided therefor on a front dash of a driver's compartment of a motor vehicle.

16. Record medium reproducing apparatus as in claim 15, wherein said display means includes a heads-up display unit mounted above said dash adjacent a windshield of the motor vehicle, and said display means including means producing a display of said title data which is reflected off said windshield so as to be readable by an operator of said motor vehicle without diverting his or her eyes from the vehicle's path of travel.

17. Record medium reproducing apparatus as in claim 16, wherein said selecting means includes at least one key situated on said heads-up display unit.

18. Record medium reproducing apparatus as in claim 17 wherein said heads-up display unit includes scroll key means permitting the vehicle operator to scroll up or down through the title data displayed on said heads-up display unit, and at least one additional key for actuating said automatic advancing means in accordance with the scrolled title data being displayed.

19. In a recorded magnetic tape cassette of the type having a cassette housing and an elongated magnetic tape on which are recorded a sequence of audio selections, in a track on the tape, the selections each commencing at a respective location on the tape along its length; the improvement comprising a block of data recorded in said track on said tape in a space in advance of a first of said recorded audio selections, said recorded data block including magnetically recorded title data identifying all the respective selections and location data identifying the subsequent associated locations along the tape where the respective selections in said track each commence.

20. The improved magnet tape cassette of claim 19 in which said tape is wound upon supply and take-up means in the housing and has two ends, and in which a portion of said selections are recorded in one or more tracks on one side of said tape to be reproduced when the tape is advanced in one direction with the remaining selections being recorded in one or more additional tracks on another side of the tape to be reproduced when the tape is advanced in the other direction; and in which substantially identical versions of said recorded data block are situated at the respective end on each side of the tape, to reproduce said magnetically recorded title data and location data when the tape is advanced from the end in either direction.

* * * * *